United States Patent
Kawakami

(10) Patent No.: US 6,888,682 B2
(45) Date of Patent: May 3, 2005

(54) PROJECTOR LENS SYSTEM

(75) Inventor: Etsuro Kawakami, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 10/792,442

(22) Filed: Mar. 2, 2004

(65) Prior Publication Data

US 2004/0257670 A1 Dec. 23, 2004

(30) Foreign Application Priority Data

Mar. 6, 2003 (JP) .................................. 2003-059533

(51) Int. Cl.$^7$ .................................. G02B 15/14; G02B 3/00
(52) U.S. Cl. .................. 359/651; 359/649; 359/680; 359/682; 359/689; 359/691; 359/716; 359/717; 359/749; 359/753; 353/37; 353/101
(58) Field of Search .................................. 359/649–651, 359/680, 682, 689, 691, 716–717, 749, 753

(56) References Cited

U.S. PATENT DOCUMENTS

| | | | |
|---|---|---|---|
| 4,018,511 A | | 4/1977 | Takahashi |
| 5,666,228 A | * | 9/1997 | Yamamoto .................. 359/651 |
| 5,724,193 A | | 3/1998 | Hirakawa |
| 5,946,144 A | * | 8/1999 | Yamamoto .................. 359/742 |
| 6,084,719 A | * | 7/2000 | Sugawara et al. .......... 359/651 |
| 6,471,359 B1 | * | 10/2002 | Kim et al. ................. 353/122 |
| 6,671,102 B2 | * | 12/2003 | Wada ........................ 359/649 |
| 2002/0089761 A1 | | 7/2002 | Hirose |
| 2002/0145809 A1 | * | 10/2002 | Okuyama .................. 359/649 |
| 2004/0233547 A1 | * | 11/2004 | Sugano ....................... 359/784 |

FOREIGN PATENT DOCUMENTS

| | | |
|---|---|---|
| GB | 1238668 A | 7/1971 |
| JP | 2001-051195 A | 2/2001 |

\* cited by examiner

*Primary Examiner*—Evelyn A. Lester
(74) *Attorney, Agent, or Firm*—Frishauf, Holtz, Goodman & Chick P.C.

(57) ABSTRACT

A projector lens system includes a negative first lens group and a positive second lens group. The first lens group comprises a first lens element that is formed as a negative meniscus lens element, a positive or negative second lens element, a negative third lens element, a positive fourth lens element that is cemented to or separated from the third lens element, and a negative fifth lens element. The first lens group satisfies condition (1) with respect to the refractive power thereof, and satisfies condition (2) with respect to the refractive power of the negative first lens element of the negative first lens group:

$$0.6 < f_w/|f_I| < 1.0 \, (f_I < 0) \quad (1)$$

$$0.3 < f_I/f_{1,1} < 0.7 \quad (2)$$

wherein $f_w$: focal length of the entire projector lens system at the wide-angle extremity;

$f_I$: the focal length of the negative first lens group; and $f_{1,1}$: the focal length of the negative first lens element of the negative first lens group.

15 Claims, 11 Drawing Sheets

(EMBODIMENT 1)

(EMBODIMENT 1)

FIG. 2A  FIG. 2B  FIG. 2C
(EMBODIMENT 1 : WIDE-ANGLE EXTREMITY)
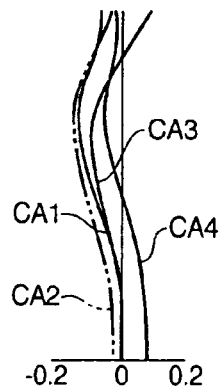
SPHERICAL ABERRATION
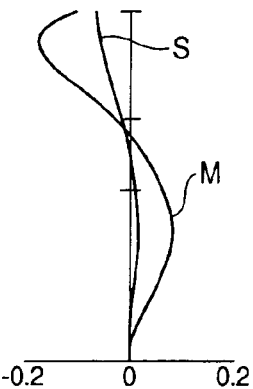
ASTIGMATISM
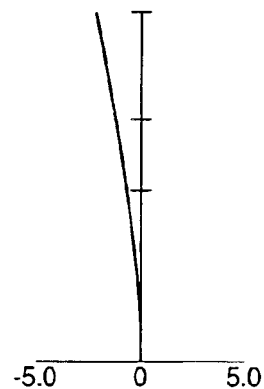
DISTORTION
FIG. 2D  FIG. 2E  FIG. 2F
(EMBODIMENT 1 : INTERMEDIATE AREA)
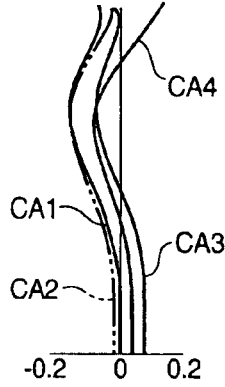
SPHERICAL ABERRATION
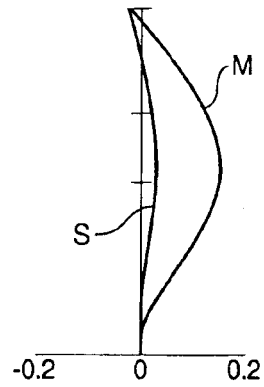
ASTIGMATISM
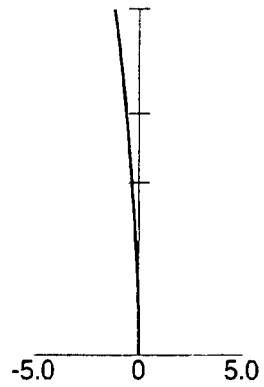
DISTORTION
FIG. 2G  FIG. 2H  FIG. 2I
(EMBODIMENT 1 : TELE-PHOTO EXTREMITY)
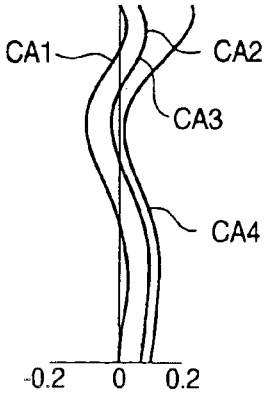
SPHERICAL ABERRATION
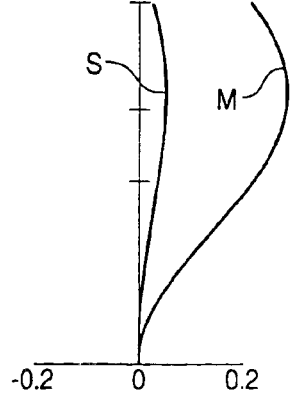
ASTIGMATISM
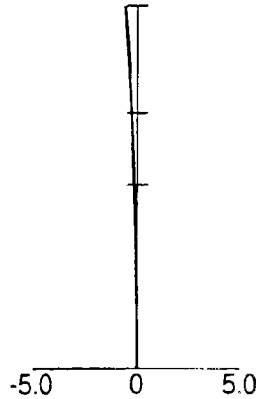
DISTORTION (EMBODIMENT 2)

FIG. 4A  FIG. 4B  FIG. 4C
(EMBODIMENT 2 : WIDE-ANGLE EXTREMITY)
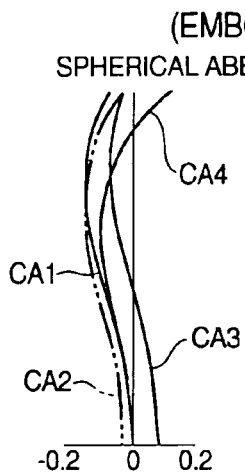 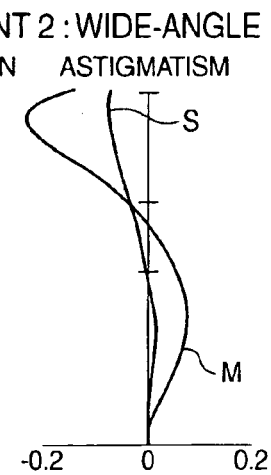 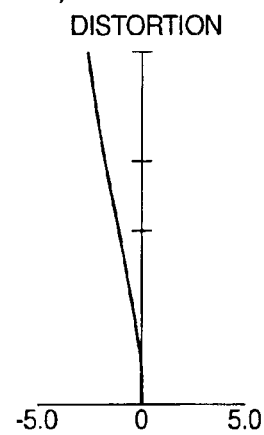
FIG. 4D  FIG. 4E  FIG. 4F
(EMBODIMENT 2 : INTERMEDIATE AREA)
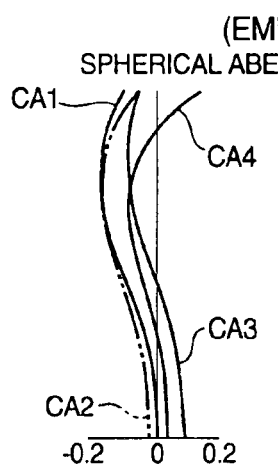 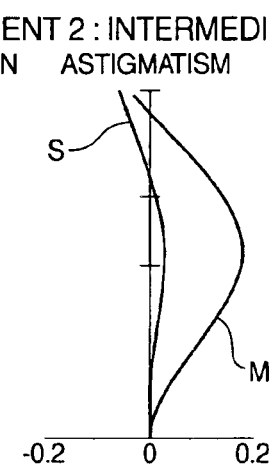 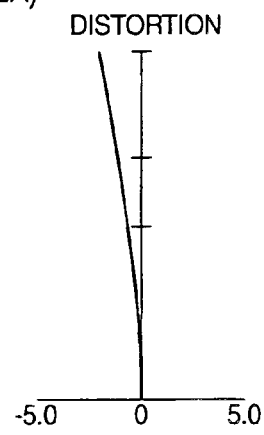
FIG. 4G  FIG. 4H  FIG. 4I
(EMBODIMENT 2 : TELE-PHOTO EXTREMITY)
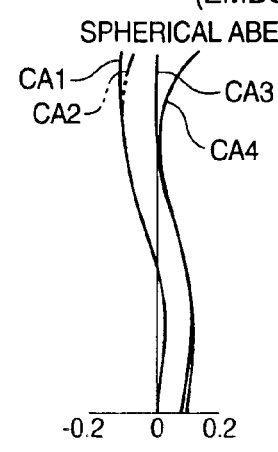 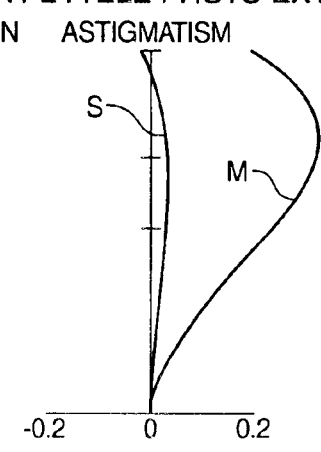 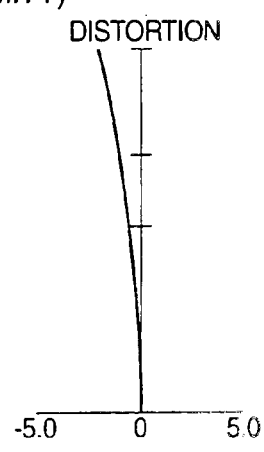

DISTANCE : ∞

DISTANCE : 2m

DISTANCE : 1m

DISTANCE : ∞

DISTANCE : 2m

DISTANCE : 1m (EMBODIMENT 3)

FIG. 8A  FIG. 8B  FIG. 8C
(EMBODIMENT 3 : WIDE-ANGLE EXTREMITY)
SPHERICAL ABERRATION  ASTIGMATISM  DISTORTION
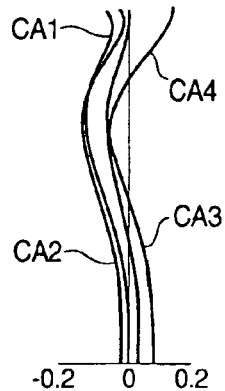
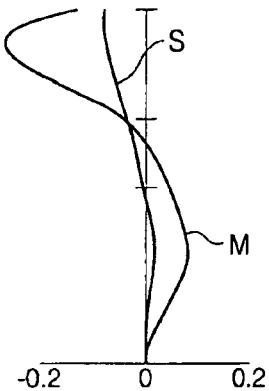
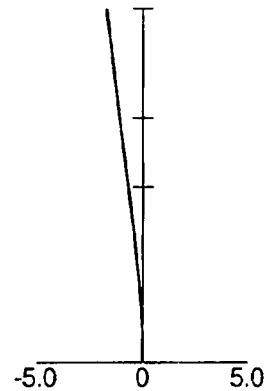
FIG. 8D  FIG. 8E  FIG. 8F
(EMBODIMENT 3 : INTERMEDIATE AREA)
SPHERICAL ABERRATION  ASTIGMATISM  DISTORTION
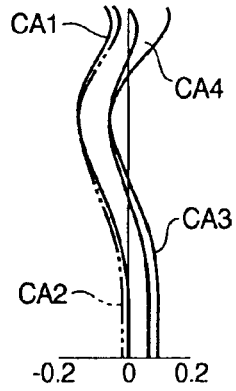
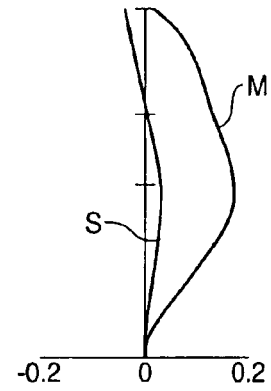
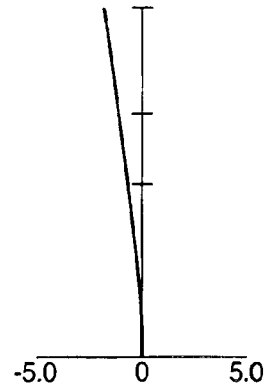
FIG. 8G  FIG. 8H  FIG. 8I
(EMBODIMENT 3 : TELE-PHOTO EXTREMITY)
SPHERICAL ABERRATION  ASTIGMATISM  DISTORTION
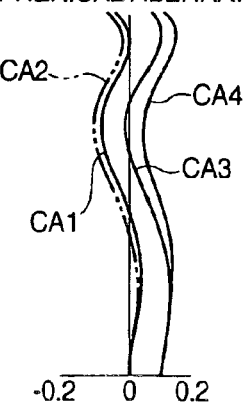
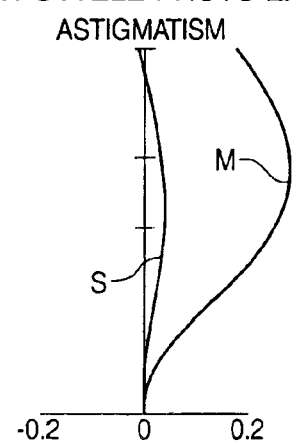
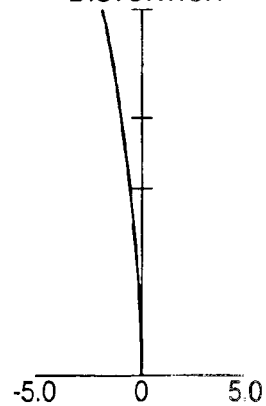

(EMBODIMENT 4)

FIG.10A  FIG.10B  FIG.10C
(EMBODIMENT 4 : WIDE-ANGLE EXTREMITY)
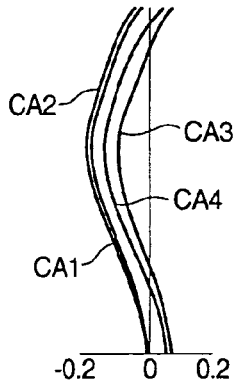
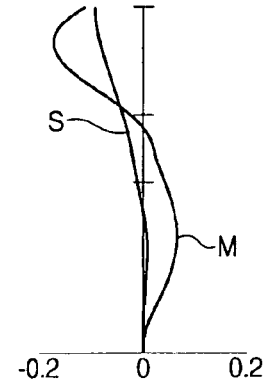
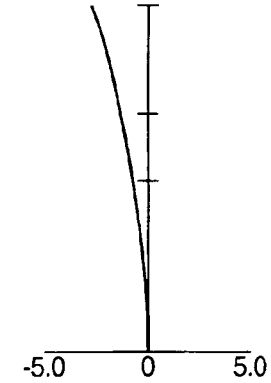
FIG.10D  FIG.10E  FIG.10F
(EMBODIMENT 4 : INTERMEDIATE AREA)
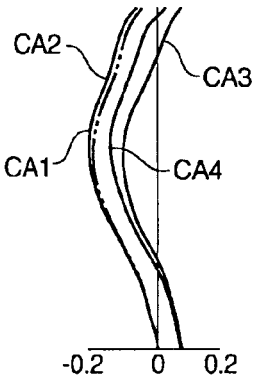
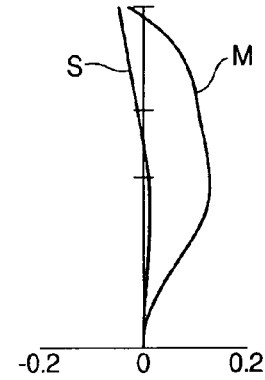
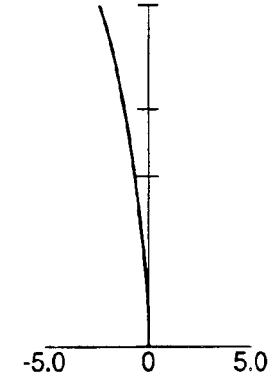
FIG.10G  FIG.10H  FIG.10I
(EMBODIMENT 4 : TELE-PHOTO EXTREMITY)
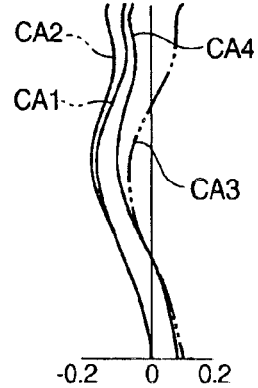
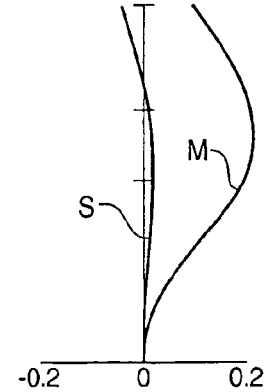
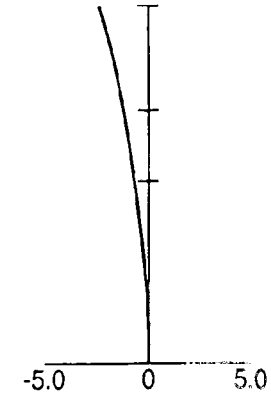

(EMBODIMENT 5)

(EMBODIMENT 5 : WIDE-ANGLE EXTREMITY)
SPHERICAL ABERRATION

ASTIGMATISM

DISTORTION (EMBODIMENT 5 : INTERMEDIATE AREA)
SPHERICAL ABERRATION

ASTIGMATISM

DISTORTION (EMBODIMENT 5 : TELE-PHOTO EXTREMITY)
SPHERICAL ABERRATION

ASTIGMATISM

DISTORTION ously used. As an example, Japanese Unexamined Patent Publication No.2001-51195 has taught an apparatus utilizing such a DMD.

PROJECTOR LENS SYSTEM

BACKGROUND OF THE INVENTION

1. Field of the Invention

The present invention relates to a projector lens system for projecting an image from a light bulb, especially a light bulb such as a digital micromirror device (herein after, DMD), which forms an image by changing directions of the micromirrors and the reflecting-direction of light rays.

2. Description of the Prior Art

In recent years, a DMD as a light bulb for a projector has become commercially viable, instead of liquid crystal display panels which have been widely used over many years. The DMD displays an image by arranging miniature micromirrors (mirror-surface elements) on a flat surface so as to correspond to pixels, and the angle of each mirror surface is mechanically controlled by employing micro-machine technology. Furthermore, the DMD has a faster response speed than a liquid crystal displays does, and can obtain a brighter image. Therefore the DMD is showing clear signs of wide popularization due to being suitable for achieving a miniaturized portable projector having high luminance and high image quality. As an example, Japanese Unexamined Patent Publication No.2001-51195 has taught an apparatus utilizing such a DMD.

In the case where a DMD is used in a projector apparatus as a light bulb, restrictions inherent to the DMD have to be imposed on the projector lens system.

The first restriction concerns the F-number of the projector lens system. Currently, when a DMD produces an image, the micromirrors are swiveled at an angle of ±12°; and by swiveling the micromirrors, effective reflection light rays (effective light rays) are separated from void reflection light rays (void light rays). Accordingly, in a projector utilizing a DMD as a light bulb, the following condition has to be met, i.e., it is required to use effective light rays only, and at the same time, not to use void light rays. By this condition, the F-number of the projector lens system can be determined, namely, the F-number is 2.4. Actually, since an increase of the amount of light rays as could as possible has been demanded, it is common practice to constitute the projector lens system having an F-number of 2.0, by considering a decrease of contrast within a range causing no adverse effects.

Furthermore, it should be understood that a condition like the above is established, provided that the light-bulb-side pupil of the projector lens system remains at a fixed position. Accordingly, in the case where the pupil position is variable, e.g., a zoom lens system, consideration has to be taken for optimizing the position of the pupil at the wide-angle extremity where brightness becomes generally lower due to loss in the amount of light rays.

The second restriction concerns the positional relationship between the DMD and the light-source system. In order to further miniaturize the projector lens system, it is preferable that the image circle of the projector lens system be as small as possible. Consequently, the position where the light source system, which inputs a projector light bundle to the DMD, is provided is limited, so that the light source system has to be positioned in substantially the same direction as the projector lens system (i.e., adjacent to each other) is, in order to make effective light rays from the DMD incident on the projector lens system.

Furthermore, the space between the light bulb and the most light-bulb-side lens element of the projector lens system (i.e., the back focal distance) is utilized for both the projector lens system and the light source system, so that a longer back focal distance has to be secured for the projector lens system, and at the same time, there is a need to make a lens system on the side of the light bulb smaller in order to secure sufficient light-guiding space from the light source system. This optical arrangement is equivalent to positioning the light-bulb-side pupil of the projector lens system in the vicinity of the rear of the projector lens system, from the viewpoint of the optical design for the projector lens system.

On the other hand, in order to improve the optical performance of the projector lens system, there is a need to use a large number of lens elements. However, if a large number of lens elements are employed in the projector lens system, the overall length thereof will become longer; and consequently, in the case of a lens system having the entrance pupil at a rearward portion thereof, the diameters of lens elements at a front portion thereof become larger.

Although there are restrictions as mentioned above in developing a projector apparatus, a projector apparatus employing a DMD as a light bulb is understood to be more advantageous than others not employing a DMD, in order to attain further miniaturization. Therefore currently, portable and compact apparatuses with a DMD, such as a data projector, etc., have been widely used.

In order to miniaturize the projector apparatus itself, there is obviously a high demand for the projector lens system to be miniaturized, and there is also a demand for an increase in the number of functions. Moreover, the projector's various aberrations should be corrected to satisfy the performance of a DMD. Furthermore, from the viewpoint of convenience, there are demands for zooming function with a large zoom ratio, and for having a large angle-of-view at the wide-angle extremity.

SUMMARY OF THE INVENTION

The present invention provides a projector apparatus which materializes a projector lens system being compact, having a wide angle-of-view, and having a high image-forming performance suitable for the characteristics of a light bulb, such as a DMD, which is arranged to form an image by changing the reflecting-direction of light rays. The projector apparatus of the present invention can project an image on a large screen with high picture quality even in a limited space, such as a small conference-room, etc.

According to an aspect of the present invention, there is provided a projector lens system which projects and enlarges an image from a light bulb of a projector display device onto a screen.

The projector lens system includes a first lens group having a negative refractive power (hereinafter, negative first lens group), a second lens group having a positive refractive power (hereinafter, positive second lens group), and a third lens group having a positive refractive power (hereinafter, positive third lens group), in this order from the projection side.

The negative first lens group includes a first lens element which is formed as a negative meniscus lens element having the convex surface facing toward the projection side, a positive or negative second lens element, a negative third lens element, a positive fourth lens element which is cemented to or separated from the third lens element, and a negative fifth lens element, in this order from the projection side.

The negative first lens group satisfies condition (1) with respect to the refractive power thereof, and satisfies condition (2) with respect to the refractive power of the negative first lens element thereof:

$$0.6 < f_w/|f_I| 1.0 \tag{1}$$

(Note: Absolute value is used due to $f_I < 0$)

$$0.3 < f_I/f_{1,1} < 0.7 \tag{2}$$

wherein
$f_w$ designates the focal length of the entire the projector lens system at the wide-angle extremity;
$f_I$ designates the focal length of the negative first lens group; and
$f_{1,1}$ designates the focal length of the negative first lens element of the negative first lens group.

Condition (1) specifies an appropriate distribution of refractive power to the negative first lens group. This condition is necessary to achieve balance between the size of the entire projector lens system and requirements for appropriately correcting various aberrations. In addition to the above, condition (1) is for securing a back focal distance, since a space for providing an optical system(hereinafter, illuminating optical system) for illuminating a light bulb, such as a DMD, or the like, has to be provided.

In a projector lens system utilizing a DMD, the illuminating optical system is positioned so that the light rays therefrom are reflected on the surface of a DMD facing toward the projector lens system, and then the light rays from the DMD progress toward the projector lens system. Accordingly, the illuminating optical system is positioned in an area within the back focal distance, i.e., between the final surface of the most light-bulb-side lens group and the DMD. For example, in FIGS. 1 and 3, the light rays from the illuminating optical system run along the light path D30 to the surface of a DMD, and thereafter, the light rays reflected by the surface of a DMD again run along the light path D30 toward the projector lens system. This can be applied to the two-lens-group arrangement (FIG. 1) and the three-lens-group arrangement (FIG. 3).

If the upper limit of condition (1) is exceeded, the negative refractive power of the first lens group becomes stronger; and accordingly, the refractive power of the positive second and positive third lens groups have to be made stronger. Consequently, it becomes difficult to achieve balance among various aberrations, and the optical performance of the projector lens system deteriorates.

If the lower limit of condition (1) is exceeded, the distance between the negative first lens group and the positive second lens group has to make longer, so that the size of the entire projector lens system becomes larger. As a result, the purpose of further miniaturization cannot be achieved, or the back focal distance cannot be secured.

Condition (2) relates to the distribution of refractive power in the negative first lens group under the condition that condition (1) is satisfied. Namely, it is particularly necessary to provide an appropriate negative refractive power to the first lens element of the negative first lens group in order to secure the back focal distance, and maintain balance among various aberrations.

If the upper limit of condition (2) is exceeded, it would be easy to satisfy requirements of the back focal distance, and to maintain balance among various aberrations; however, it becomes difficult to produce the negative first lens group, and the production costs thereof becomes higher.

If the lower limit of condition (2) is exceeded, it becomes difficult to secure the back focal distance, and to maintain balance among various aberrations.

In addition to the above, a radius of curvature of the light-bulb-side surface of the negative first lens element of the negative first lens group preferably satisfies condition (3); a radius of curvature of the projection-side surface of the negative fifth lens element of the negative first lens group preferably satisfies condition (4); Abbe numbers of glass materials used for lens elements of the negative first lens group except for the second lens element preferably satisfy condition (5); and a refractive index of a glass material used for the positive fourth lens element preferably satisfies condition (6):

$$-1.8 < f_I/r_{12} < -1.0 \tag{3}$$

$$0.8 < f_I/r_{19} < 1.7 \tag{4}$$

$$15 < (v_{1,1} + v_{1,3} + v_{1,5})/3 - v_{1,4} \tag{5}$$

$$1.7 < n_{1,4} \tag{6}$$

wherein
$r_{12}$ designates a radius of curvature of a light-bulb-side surface of the negative first lens element of the negative first lens group;
$r_{19}$ designates a radius of curvature of the projection-side surface of the negative fifth lens element of the negative first lens group;
$v_{1,1}$ designates the Abbe number of the negative first lens element of the negative first lens group;
$v_{1,3}$ designates the Abbe number of the negative third lens element of the negative first lens group;
$v_{1,4}$ designates the Abbe number of the positive fourth lens element of the negative first lens group;
$v_{1,5}$ designates the Abbe number of the negative fifth lens element of the negative first lens group; and
$n_{1,4}$ designates the refractive index with respect to the d-line of the positive fourth lens element of the negative first lens group.

Condition (3) is for reducing coma and distortion under the condition that negative refractive power is given to the first lens element of the negative first lens group according to condition (2). Namely, by satisfying these two conditions (2) and (3), the first lens element becomes the shape of a meniscus lens element having a strong negative refractive power.

If the upper limit of condition (3) is exceeded, coma and distortion cannot sufficiently be reduced.

If the lower limit of condition (3) is exceeded, it is effective to reduce the occurrence of various aberrations; however, the curved-shape of the negative meniscus lens element becomes too sharp, so that producing the negative first lens element becomes difficult.

Condition (4) specifies the ratio of the combined focal length of the negative first lens group to the radius of curvature of the projection-side surface of the negative fifth lens element of the negative first lens group. This condition influences the correcting of spherical aberration and coma in the negative first lens group, and the effective diameter of the negative first lens element thereof (hereinafter, the front-lens diameter).

The projector lens system of the present invention is constituted as a zoom lens system which is required to have (i) a wider angle-of-view at the wide-angle extremity, and at the same time, to have (ii) a smaller front-lens diameter. It has been know that these two requirements (i) and (ii) are generally incompatible. More specifically, in order to correct aberrations and at the same time to make the front-lens diameter smaller, a bundle of light rays corresponding to an image point at a higher image height has to be passed at a lower height through lens elements provided on the projection side in the negative first lens group. This arrangement is materialized by the negative third lens element and the negative fifth lens element in the negative first lens group. Particularly, the negative fifth lens element is arranged to characteristically work to satisfy these requirements, i.e., although the refractive power of the negative fifth lens element is weaker, the above requirements are satisfied by making the large convex surface toward the light bulb side; on the other hand, balance between having the small front-lens diameter and the correcting of spherical aberration and coma is maintained.

If the upper limit of condition (4) is exceeded, i.e., the radius of curvature of the projection-side surface of the negative fifth lens element is too small, degree of freedom with respect to the correcting of coma and spherical aberration becomes smaller.

If the lower limit of condition (4) is exceeded, the front-lens diameter has to make larger.

Condition (5) relates to the distribution of the Abbe numbers over the positive and negative lens elements of the negative first lens group; and more specifically, condition (5) is for suitably correcting chromatic aberration in the negative first lens group. By selecting glass materials for the positive and negative lens elements of the negative first lens group according to condition (5), refractive power is suitably distributed over the negative first lens group, and chromatic aberration can be adequately corrected.

If the lower limit of condition (5) is exceeded, refractive power of each lens element becomes extremely strong to correct chromatic aberration, so that various aberrations deteriorate.

Condition (6) is for determining field curvature, i.e., relates to the Petzval sum. In the negative first lens group, it should be understood that the fourth lens element which is the only and permanently positive lens element is very important to control the Petzval sum. In other words, it is important to make the Petzval sum smaller by making refractive power stronger, i.e., the value of the refractive index is set larger.

If the lower limit of condition (6) is exceeded, the Petzval sum becomes larger, so that field curvature becomes larger. Consequently, it becomes difficult to control the image, as desired, at an image height around the periphery of a lens element.

Furthermore, the second lens element of the negative first lens group is made from a resin material; and an aspherical surface is formed on at least the light-bulb-side surface thereof. The second lens element preferably satisfies condition (7) with respect to the refractive power.

$$|f_l/f_{1,2}|<0.25 \tag{7}$$

wherein
  $f_{1,2}$ designates the focal length of the second lens element of the negative first lens group.

From the viewpoint of correcting distortion, forming an aspherical surface on both negative first lens element and the second lens element is effective; however, the diameter of these lens element, e.g., the second lens element having a smaller effective diameter, varies from 32.6 mm to 34.8 mm. The size of these lens elements is disadvantageous to utilize a current glass-molding process with respect to the production costs thereof.

If an aspherical lens element made of a resin material is employed, the disadvantage on costs is eliminated. Moreover, such an aspherical lens element is more preferably employed as the second lens element than as the first lens element exposed to outside of to projection lens system, since a lens surface made of a resin material is vulnerable to scratch, etc.

Accordingly, condition (7) specifies a range in which the second lens element made of a resin material maintains optical performance as a projector lens element. Here, in the case where a lens element is made of a resin material, consideration should be taken to (a) reduce the change in the refractive index due to the change in temperature and humidity, and to (b) maintain the thickness of the second lens element as uniform as possible (refer to, e.g., the second lens element L12 shown in FIG. 1) so that molding the second lens element can be made easier. In order to satisfy these considerations (a) and (b), it is necessary to weaken refractive power to be distributed to the second lens element.

If the lower limit of condition (7) is exceeded, refractive power distributed to the second lens element becomes excessively strong to maintain optical performance as a projector lens element. Consequently, optical performance cannot suitably be maintained when the change in temperature and humidity occurs.

Still further, the projector lens system can perform focusing by moving the negative first lens element through the positive fourth lens element toward the projection side, in accordance with the change in a projecting distance from infinity to a closer distance. The combined focal length of the first through fourth lens elements preferably satisfies condition (8):

$$0.2<f_l/f_{1,1-4}<0.9 \tag{8}$$

wherein
  $f_{1,1-4}$ designates the combined focal length of the negative first through positive fourth lens elements of the negative first lens group.

Condition (8) is for determining a suitable traveling distance, with less fluctuations of aberrations, of the negative first lens element though the positive fourth lens element in the case where the first through fourth lens elements are independently moved from the negative fifth lens element.

In a lens system in which focusing is performed by moving the entire first lens group along the optical axis, the positional relationship between the second lens group and each lens element of the first lens group varies. The negative fifth lens element, as explained, is arranged to have a strong deflecting function with respect to a bundle of light rays corresponding to an image point at a higher image height, so that the negative fifth lens element largely influences image-forming performance on the periphery of the screen. More specifically, the change in the positional relationship between the negative fifth lens element and the second lens group appears as fluctuations of aberrations. Accordingly, in order to reduce fluctuations of aberrations due to a focusing distance, the lens elements to be moved upon focusing are preferably the negative first lens element through the positive fourth lens element. By determining the focal length of the lens elements to be used in focusing (i.e., the first through fourth lens elements, as a focusing lens group) according to the range defined in condition (8), a suitable traveling distance with less fluctuations of aberrations become possible.

If the upper limit of condition (8) is exceeded, refractive power of the focusing lens group becomes too strong, so that the traveling distance thereof becomes shorter. Consequently, a focus-adjusting operation becomes difficult, considering precision of the mechanism of the projector lens system.

If the lower limit of condition (8) is exceeded, the traveling distance of the focusing lens group becomes longer, so that fluctuations of aberrations become larger.

The second lens group includes a positive first lens element, a positive second lens element, a negative third lens element which is cemented to the positive second lens element, a negative fourth lens element, a positive fifth lens element which is cemented to the positive fourth lens element, and a positive sixth lens element. The positive first lens element and the positive sixth lens element of the second lens group preferably satisfy condition (9) with respect to the refractive power thereof; and the negative fourth lens element and the positive fifth lens element which are cemented preferably satisfy condition (10) with respect to the combined focal length thereof:

$$1.7 < f_{2,6}/f_{2,1} < 3.0 \quad (9)$$

$$-0.5 < f_{II}/f_{2,4\text{-}5} < 0 \quad (10)$$

wherein $f_{2,1}$ designates the focal length of the positive first lens element of the second lens group;

$f_{2,6}$ designates the focal length of the positive sixth lens element of the second lens group;

$f_{II}$ designates the combined focal length of the second lens group; and $f_{2,4\text{-}5}$ designates the combined focal length of the negative fourth lens element and the positive fifth lens element of the second lens group.

Condition (9) relates to the correcting of monochromatic aberration in the second lens group. The second lens group is arranged in a Gauss lens arrangement or a double Gauss lens arrangement. Accordingly, by providing a strong positive refractive power to the positive first lens element and the positive sixth lens element, refractive power is balanced over the second lens group with respect to various aberrations. This balance should not be adversely varied; however, in the case of the projector lens system of the present invention constituted as a zoom lens system, the positive first lens element of the second lens group has to converge the diverging light rays emitted from the negative first lens group. Therefore the positive first lens element is provided with a stronger refractive power than the positive sixth lens element is, within the range of condition (9).

If the upper limit of condition (9) is exceeded, i.e., the refractive power of the positive first lens element is too strong, degree of freedom on the correcting of various aberrations becomes smaller.

If the lower limit of condition (9) is exceeded, the converging function has to be shared by the positive first lens element, and by other lens elements of the second lens group as well, and the aberration balance of the entire second lens group is adversely varied.

Condition (10) is for correcting chromatic aberration and coma in the second lens group. More specifically, chromatic aberration is corrected by the combined surface of the negative fourth lens element and the positive fifth lens element which constitute cemented lens elements, although the refractive power of these cemented elements is relatively weaker, compared with refractive power of cemented lens elements in general.

If either the upper or lower limits of condition (10) are exceeded, the balance of chromatic aberration in the entire projector lens system is deteriorated.

Furthermore, in regard to the second lens group, a radius of curvature of the projection-side surface of the positive first lens element of the second lens group preferably satisfies condition (11); a relationship between the radius of curvature of the projection-side surface of the positive first lens element and a radius of curvature of the light-bulb-side surface of the positive sixth lens element preferably satisfies condition (12); a radius of curvature of the projection-side surface of the negative fourth lens element and a refractive power of the second lens group preferably satisfies condition (13); an Abbe number of a glass material used for each of the positive and negative lens elements preferably satisfies condition (14); and a refractive index of a glass material used for each positive lens element preferably satisfies condition (15):

$$1.0 < f_{II}/r_{21} < 1.6 \quad (11)$$

$$-1.5 < r_{21}/r_{30} < -0.6 \quad (12)$$

$$-1.5 < f_{II}/r_{26} < -0.6 \quad (13)$$

$$15 < (v_{2,1}+v_{2,2}+v_{2,5}+v_{2,6})/4 - (v_{2,3}+v_{2,4})/2 \quad (14)$$

$$0 < (n_{2,1}+n_{2,2})/2 - (n_{2,5}+n_{2,6})/2 \quad (15)$$

wherein $r_{21}$ designates a radius of curvature of the projection-side surface of the positive first lens element of the second lens group;

$r_{26}$ designates a radius of curvature of the projection-side surface of the negative fourth lens element thereof the second lens group;

$r_{30}$ designates a radius of curvature of the light-bulb-side surface of the positive sixth lens element thereof;

$v_{2,1}$ designates the Abbe number of the positive first lens element thereof;

$v_{2,2}$ designates the Abbe number of the positive second lens element thereof;

$v_{2,3}$ designates the Abbe number of the negative third lens element thereof;

$v_{2,4}$ designates the Abbe number of the negative fourth lens element thereof;

$v_{2,5}$ designates the Abbe number of the positive fifth lens element there of;

$v_{2,6}$ designates the Abbe number of the positive sixth lens element thereof;

$n_{2,1}$ designates the refractive index of the positive first lens element thereof with respect to the d-line;

$n_{2,2}$ designates the refractive index of the positive second lens element thereof with respect to the d-line;

$n_{2,5}$ designates the refractive index of the positive fifth lens element thereof with respect to the d-line; and $n_{2,6}$ designates the refractive index of the positive sixth lens element thereof with respect to the d-line.

Condition (11) relates to the shape of the positive first lens element of the second lens group. In particular, the projection-side surface of the positive first lens element converges strong diverging light rays emitted from the negative first lens group, and also needs to correct spherical aberration. Accordingly, the lens surface of the positive first lens element needs to have a strong refractive surface power.

If the upper limit of condition (11) is exceeded, a sufficient converging function is obtained; however, the under-corrected spherical aberration remains.

If the lower limit of condition (11) is exceeded, refractive power for converging the light rays emitted from the negative first lens group becomes insufficient, so that the converging function has to be shared by the positive first lens element, and by other lens elements in the second lens group as well. As a result, various aberrations deteriorate.

Condition (12), together with condition (11), is for correcting spherical aberration and various other aberrations in a well balanced manner.

If the upper limit of condition (12) is exceeded, the correcting of various aberrations become difficult.

If the lower limit of condition (12) is exceeded, the correcting of spherical aberration cannot be carried out.

Condition (13) relates to the shape of the negative fourth lens element of the second lens group. The shape of the projection-side surface of the negative fourth lens element is particularly important. Namely, the negative fourth lens element is arranged to correct the under-corrected spherical aberration occurred in the positive first lens element, to make a bundle of light rays concentric with respect to the diaphragm, and adequately correct coma. If the upper limit of condition (13) is exceeded, i.e., the radius of curvature of the projection-side surface of the negative fourth lens element of the second lens group becomes too large, the correcting of coma becomes difficult.

If the lower limit of condition (13) is exceeded, the correcting of spherical aberration becomes difficult.

Condition (14) relates to the distribution of the Abbe numbers used for the positive and negative lens elements in the second lens group. More specifically, this condition is for correcting chromatic aberration, and for maintaining a balance between chromatic aberration and various other aberrations.

If the lower limit of condition (14) is exceeded, the refractive power of each lens element to correct chromatic aberration becomes larger, which is disadvantageous for correcting spherical aberration and coma.

Condition (15) relates to the selection of an refractive index of a glass material used for each of the positive lens elements in the second lens group. In the second lens group, for the purpose of correcting spherical aberration, coma, and various other aberrations, the first lens element and the second lens element are required to have a stronger refractive power than the fifth lens element and the sixth lens element are.

Accordingly, the refractive index of a glass material to be selected for the first and second lens elements needs to be higher.

If the lower limit of condition (15) is exceeded, the correcting of spherical aberration and various other aberrations becomes difficult.

At least one of the projection-side surface of the positive first lens element and the light-bulb-side surface of the positive sixth lens element of the second lens group is preferably provided with an aspherical lens surface.

The above is because both the projection-side surface of the positive first lens element and the light-bulb-side surface of the positive sixth lens element largely influence the correcting of spherical aberration and coma.

Accordingly, by forming an aspherical surface on at least one of these surfaces, it is advantageous for correcting spherical aberration and coma, and further miniaturization and higher optical performance of the projector lens system become possible.

Furthermore, the third lens group is preferably constituted by one positive lens element only, and satisfies condition (16) with respect to the refractive power thereof:

$$0.20 < f_w/f_{III} < 0.27 \quad (16)$$

wherein $f_{III}$ designates the focal length of the third lens group.

In order to efficiently form an image on a screen with a bundle of light rays from a light bulb, such as a DMD, the angle of the principal ray of a bundle of light rays between the third lens group and the DMD has to be set in accordance with the characteristics of the illumination optical system. In many cases, the angle of the principal ray is set to be substantially telecentrical. In order to ensure such telecentricity, it is necessary to position the focal point of the third lens group in the vicinity of the exit pupil of the second lens group. This positional arrangement can be achieved by providing a refractive power of the third lens group within the range of condition (16).

If either the upper or lower limits of condition (16) are exceeded, the focal point of the third lens group cannot be positioned in the vicinity of the exit pupil of the second lens group, so that various aberrations deteriorate.

The present disclosure relates to subject matter contained in Japanese Patent Application No. 2003-59533 (filed on Mar. 6, 2003) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C, 2D, 2E, 2F, 2G, 2H and 2I show various aberrations occurred in the projector lens system of the first embodiment;

FIGS. 4A, 4B, 4C, 4D, 4E, 4F, 4G, 4H and 4I show various aberrations occurred in the projector lens system of the second embodiment;

FIGS. 8A, 8B, 8C, 8D, 8E, 8F, 8G, 8H and 8I show various aberrations occurred in the projector lens system of the third embodiment;

FIGS. 10A, 10B, 10C, 10D, 10E, 10F, 10G, 10H and 10I show various aberrations occurred in the projector lens system of the fourth embodiment;

DESCRIPTION OF THE PREFERRED EMBODIMENTS

The embodiments of the present invention will be described according to the drawings and tables.

A projector lens system of a projector display device according to each of the first through fifth embodiments includes a first lens group LG1 and a second lens group LG2, in this order from the projection side; and a third lens group LG3 is provided behind the second lens group LG2 in all embodiments other than the first embodiment.

The first lens group LG1 has a negative refractive power, and includes a first lens element L11 which is formed as a meniscus lens having the convex surface facing toward the projection side and having a negative refractive power (hereinafter referred as a negative first lens element), a second lens element L12 having a positive or negative refractive power, a negative third lens element L13, a positive fourth lens element L14 which is cemented to or separated from the negative third lens element L13, and a negative fifth lens element L15.

The second lens group LG2 has a positive refractive power, and includes a positive first lens element L21, a positive second lens element L22, a negative third lens element L23 which his cemented to the positive second lens element L22, a negative fourth lens element L24, a positive fifth lens element L25 which is cemented to the negative fourth lens element L24, and a positive sixth lens element L26.

The third lens group LG3 has a positive refractive power, and includes one positive first lens element L31 only.

Zooming is performed by moving the first lens group LG1 and the second lens group LG2 in an optical axis direction. Namely, the distances, which vary due to zooming, are defined as an distance D20 between the light-bulb-side surface of the negative fifth lens element L15 of the negative first lens group LG1 and the projection-side surface of the positive first lens element L21 of the second lens group LG2; and a distance D30 between the light-bulb-side surface of the positive sixth lens element L26 of the second lens group LG2 and a cover glass CG or the projection-side surface of the positive third lens element L31 of the positive third lens group LG3.

On the other hand, the distances between lens groups related to focusing are described as a case where a projecting distance from the projection-side surface of the negative first lens element L11 to the screen is set to 2 meters, as shown in FIGS. 2B, 2E, 2H, 4B (5B), 4E, 4H, 8B, 8E, 8H, 10B, 10E, 10H, 12B, 12E and 2H; and in this case, the negative first lens element L11 through the positive fourth lens element L14 are moved upon focusing.

Figure 5A:
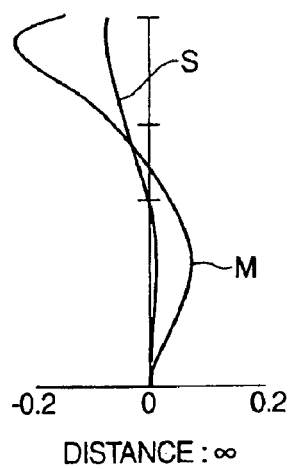
FIGS. 5A, 5B and 5C show a change in field (diagram of astigmatism) of the second embodiment in the case where focusing is carried out, at the wide-angle extremity, by moving the negative first through positive fourth lens elements of the negative first lens group.
Figure 5B:
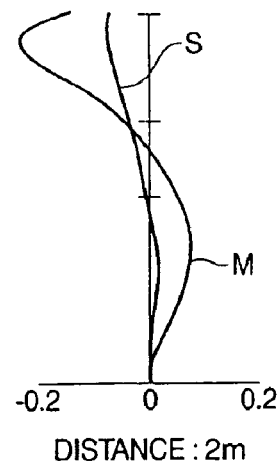
Figure 5C:
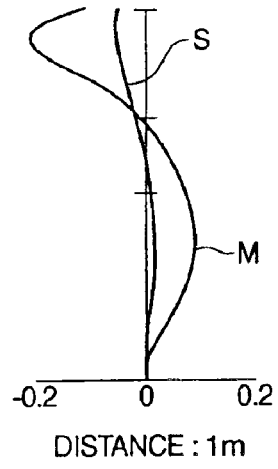

In addition to the focusing carried out under the above-described distance of 2 meters as shown in FIG. 5B, cases where the distances are infinity and 1 meter are added as shown in FIGS. 5A and 5C.

Figure 6A:
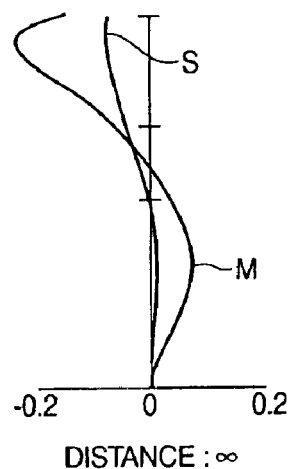
FIGS. 6A, 6B and 6C show a change in field (diagram of astigmatism) of the second embodiment in the case where focusing is carried out, at the wide-angle extremity, by moving the negative first through positive fifth lens elements of the negative first lens group.
Figure 6B:
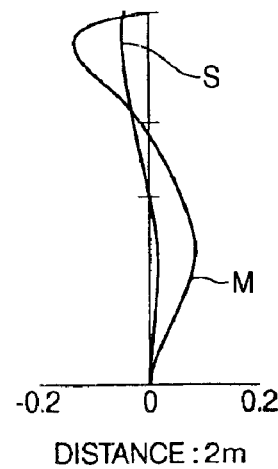
Figure 6C:
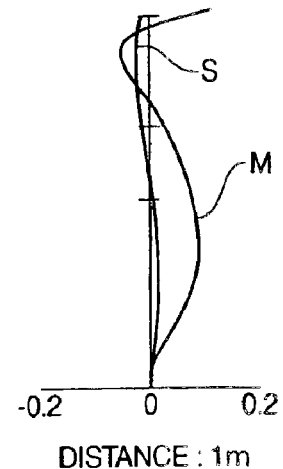

Also, in the second embodiment, cases where the negative first lens element L11 through the negative fifth lens element L15 are moved upon focusing are added with respect to infinity, 1 meter and 2 meters, as shown in FIGS. 6A, 6B and 6C.

In the case of focusing by moving the first lens element L11 though the fourth lens element L14, a distance D18 between the light-bulb-side surface of the fourth lens element L14 and the projection-side surface of the fifth lens element L15 varies.

In the case of focusing by moving the first lens element L11 though the fifth lens element L15, the distance D20 between the light-bulb-side surface of the fifth lens element L15 of the first lens group and the projection-side surface of the first lens element L21 of the second lens group varies.

Furthermore, a cover glass CG, which is a structural component of a light bulb such as a DMD, is provided between the third lens group LG3 and the light bulb surface, between which a predetermined distance is formed In the first lens group LG1, the first lens element L11 has a projection-side surface S11 and a light-bulb-side surface S12, the second lens element L12 has a projection-side surface S13 and a light-bulb-side surface S14, the third element L13 has a projection-side surface S15 and a light-bulb-side surface S16, the fourth lens element L14 has a projection-side surface S17 and a light-bulb-side surface S18, and the fifth lens element L15 has a projection-side surface S19 and a light-bulb-side surface S20.

In the second lens group LG2, the first lens element L21 has a projection-side surface S21 and a light-bulb-side surface S22, the second lens element L22 has a projection-side surface S23 and a light-bulb-side surface (the surface cemented to the third lens element L23) S24, the third lens element L23 has a light-bulb-side surface S25, the fourth lens element L24 has a projection-side surface S26 and a light-bulb-side surface (the surface cemented to the fifth lens element L25) S27, the fifth lens element L25 has a light-bulb-side surface S28, and the sixth lens element L26 has a projection-side surface S29 and a light-bulb-side surface S30.

Furthermore, the cover glass CG has a projection side surface S41 and a light-bulb-side surface S42.

In all the embodiments except for the first embodiment, the first lens element L31 constituting the third lens group LG3 has a projection-side surface S31 and a light-bulb-surface S32.

In regard to an aspherical surface which is utilized in each embodiment, the aspherical surface, as well known in the art, can be defined by the following aspherical formula, assuming that the Z axis extends along the optical axis direction, and the Y axis extends along a direction perpendicular to the optical axis:

$$Z=(Y^2/r)[1+\{1-(1+K)(Y/r)^2\}^{1/2}]+AY^4+BY^6+CY^8+DY^{10}$$

Namely, the aspherical surface is a curved surface obtained by rotating the curved line defined by the above formula about the optical axis. The shape of the aspherical surface is defined by a paraxial radius of curvature r, a conic constant K, and higher-order aspherical surface coefficients A, B, C and D.

[Embodiment 1]

The numerical values of a first embodiment of the compact wide-angle projector lens system are shown in Table 1.

Figure 1:
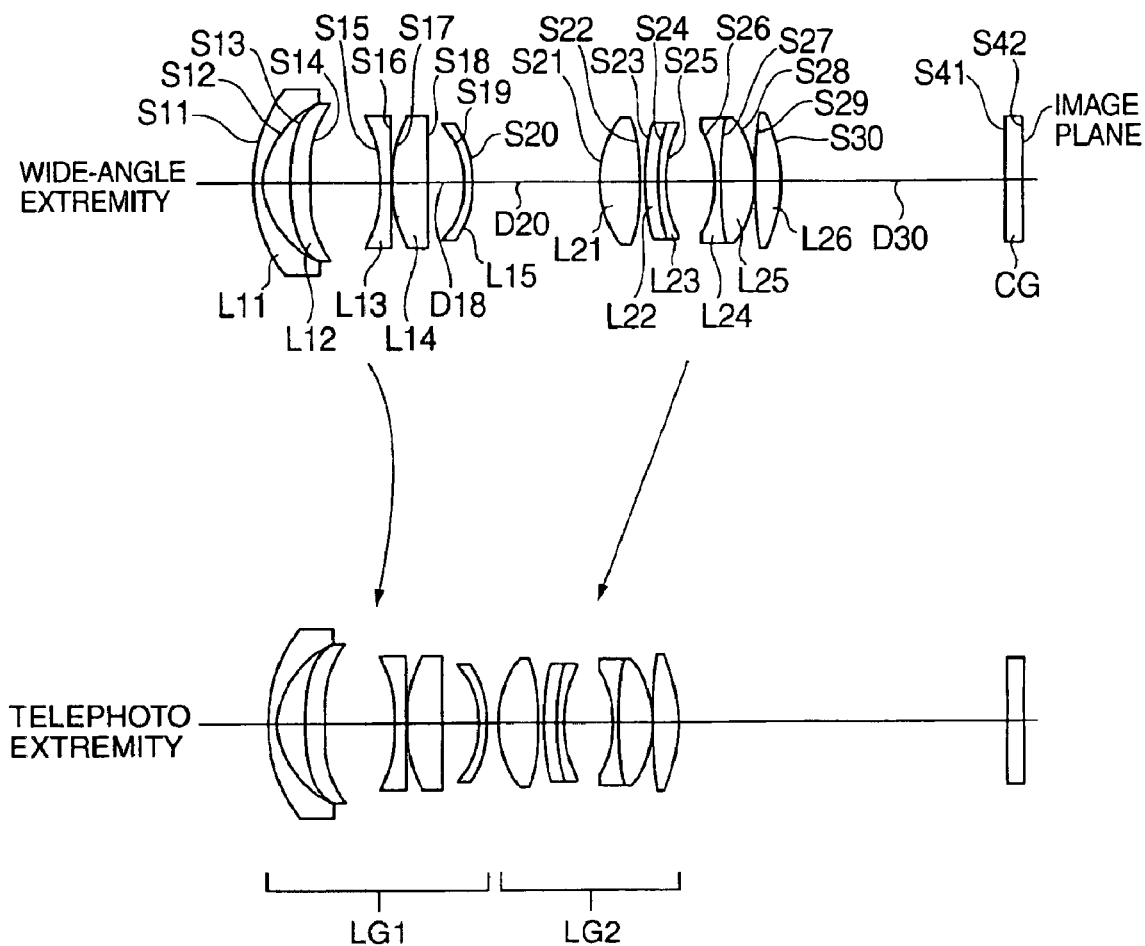
FIG. 1 shows a lens arrangement of a projector lens system according to a first embodiment of the present invention.

FIG. 1 shows a lens arrangement of a projector lens system according to the first embodiment.

FIGS. 2A through 2I show various aberrations occurred in the projector lens system of the first embodiment.

In the table and drawings, f designates the focal length of the entire projector lens system; $F_{NO}$ designates the F-number; 2ω designates the full angle of view of the projector lens system; and $b_f$ designates the back focal distance which is the reduced distance, at the wide-angle extremity, from the light-bulb-surface S30 of the positive sixth lens element L26 of the second lens group LG2 to the image plane; R designates the radius of curvature, D designates the lens-element thickness or distance between lens elements, $N_d$ designates the refractive index with respect to the d-line, and $v_d$ designates the Abbe number.

In the aberration diagrams, CA1, CA2, CA3 and CA4 designate an aberration curve at the following respective wavelengths: CA1=550.0 nm, CA2=486.1 nm, CA3=640.0 nm and CA4=435.8 nm. Furthermore, S designates the sagittal image, and M designates the meridional image.

TABLE 1 f = 20.49~26.41~34.84
Fno = 2.07~2.33~2.70
2ω = 65.65°~52.70°~40.96°
bf = 42.12

| Surf. No. | R | D | Nd | vd |
|---|---|---|---|---|
| S11 | 41.806 | 1.70 | 1.80420 | 46.50 |
| S12 | 19.421 | 4.60 | — | — |
| S13* | 339.559 | 3.22 | 1.50914 | 56.41 |
| S14* | 146.858 | 11.82 | — | — |
| S15 | −37.830 | 1.59 | 1.49700 | 81.61 |
| S16 | 176.091 | 0.53 | — | — |
| S17 | 55.888 | 6.00 | 1.80518 | 25.46 |
| S18 | −638.362 | 6.10 | — | — |
| S19 | −22.304 | 1.20 | 1.69680 | 55.46 |
| S20 | −30.294 | 21.90~11.13~2.10 | — | — |
| S21* | 26.674 | 6.70 | 1.66910 | 55.40 |
| S22* | −58.835 | 0.88 | — | — |
| S23 | 52.722 | 2.40 | 1.69680 | 55.46 |
| S24 | 64.463 | 1.15 | 1.75520 | 27.53 |
| S25 | 27.180 | 8.11 | — | — |
| S26 | −34.072 | 1.07 | 1.80610 | 33.27 |
| S27 | 76.559 | 5.92 | 1.48749 | 70.45 |
| S28 | −25.425 | 0.10 | — | — |
| S29 | 138.095 | 4.56 | 1.51760 | 63.50 |
| S30* | −36.649 | 38.70~46.10~56.67 | — | — |
| S41 | ∞ | 3.00 | 1.51680 | 64.20 |
| S42 | ∞ | — | — | — |

*designates the aspherical surface which is rotationally symmetrical with respect to the optical axis.

Aspherical surface data (the aspherical surface coefficients not indicated are zero (0.00)).
Aspherical Surface Coefficients

| S13 | $K = 0.376158 \times 10^3$ | $A = 0.673786 \times 10^{-4}$ | $B = -0.152616 \times 10^{-6}$ |
|---|---|---|---|
| | | $C = 0.516285 \times 10^{-9}$ | $D = -0.535296 \times 10^{-12}$ |
| S14 | $K = 0.510936 \times 10^2$ | $A = 0.584010 \times 10^{-4}$ | $B = -0.196316 \times 10^{-6}$ |
| | | $C = 0.675631 \times 10^{-9}$ | $D = -0.127628 \times 10^{-11}$ |
| S21 | $K = 0.225323$ | $A = -0.636685 \times 10^{-5}$ | $B = -0.336434 \times 10^{-8}$ |
| | | $C = 0.137668 \times 10^{-10}$ | $D = -0.338975 \times 10^{-13}$ |
| S22 | $K = -0.364182 \times 10$ | $A = 0.974482 \times 10^{-5}$ | $B = -0.281257 \times 10^{-8}$ |
| S30 | $K = -0.171317 \times 10^2$ | $A = -0.363413 \times 10^{-4}$ | $B = 0.184683 \times 10^{-6}$ |
| | | $C = -0.578782 \times 10^{-9}$ | $D = 0.936511 \times 10^{-12}$ |

[Embodiment 2]

The numerical values of a second embodiment of the compact wide-angle projector lens system are shown in Table 2. The signs and symbols in the table and drawings are the same as those of the first embodiment, and the wavelength values of CA1, CA2, CA3 and CA4 are also the same as those of the first embodiment.

Figure 3:
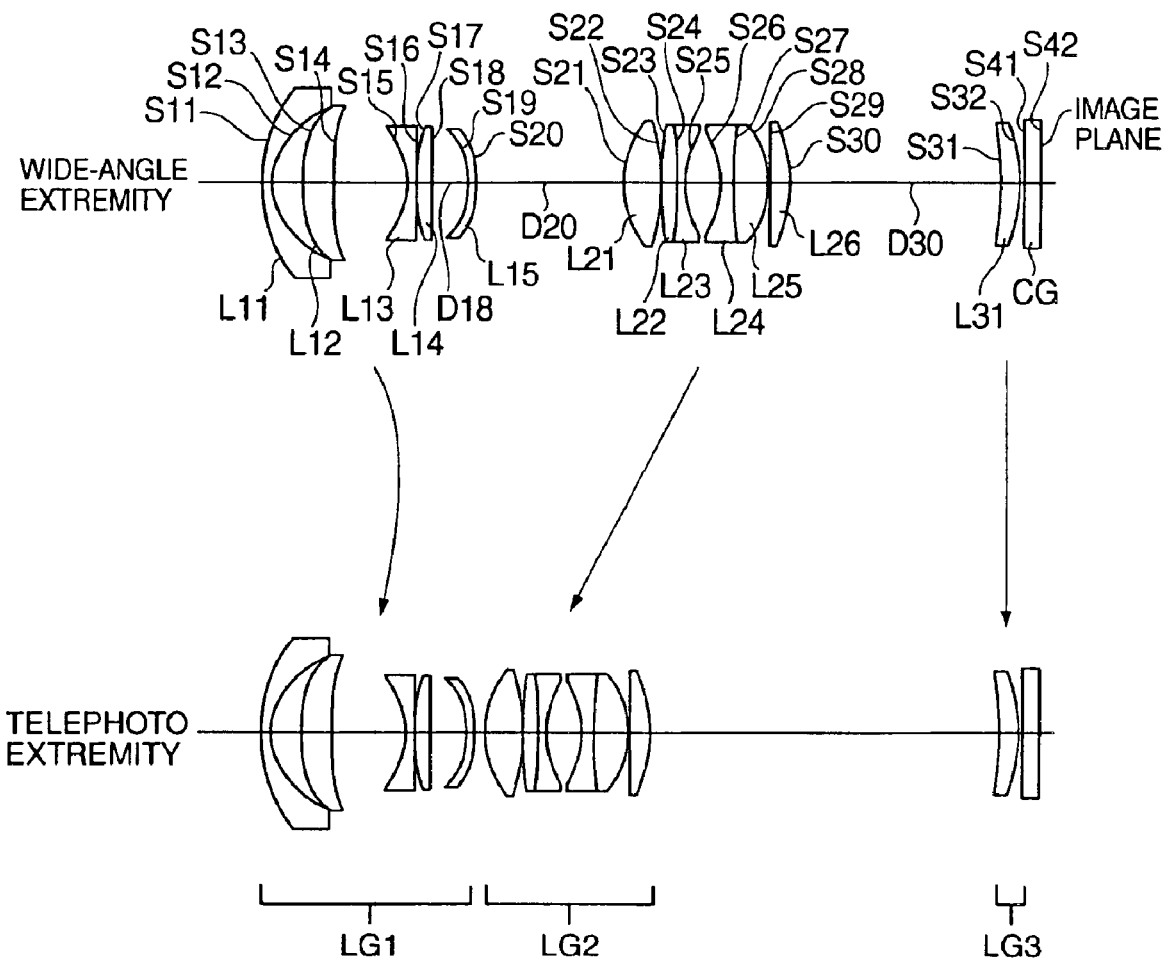
FIG. 3 shows a lens arrangement of a projector lens system according to a second embodiment of the present invention.

FIG. 3 shows a lens arrangement of a projector lens system according to the second embodiment.

FIGS. 4A through 4I show various aberrations occurred in the projector lens system of the second embodiment.

In the second embodiment and thereafter, the back focal distance $b_f$ is the reduced distance, at the wide-angle extremity, from the light-bulb-surface S32 of the positive lens element L31 of the positive third lens group LG3 to the image plane Furthermore, in order to show fluctuations of aberrations due to the movement of the lens groups upon focusing, the numerical values of the distances which vary upon focusing at the wide-angle extremity are shown in Table 3.

In connection with Table 3, FIGS. 5A, 5B and 5C show a change in field (diagram of astigmatism) in the case where focusing is carried out, at the wide-angle extremity, by moving the negative first lens element L11 through the positive fourth lens element L14 of the negative first lens group.

For the purpose of comparing with FIGS. 5A to 5C, FIGS. 6A, 6B and 6C show a change in field (diagram of astigmatism) in the case where focusing is carried out, at the wide-angle extremity, by moving the negative first lens element L11 through the positive fifth lens element L15 of the negative first lens group;

In the second embodiment, the zoom ratio of the projector lens system is 1.94, which is larger than the other embodiments; however, in the case where the negative first lens element L11 through the positive fourth lens element L14 are moved to perform focusing, fluctuations of aberrations are reduced, which indicates that the focusing of this way is appropriate.

TABLE 2 f = 20.50~28.07~39.77
Fno = 2.07~2.39~2.90
2ω = 65.63°~50.30°~36.70°
bf = 3.11

| Surf. No. | R | D | Nd | vd |
|---|---|---|---|---|
| S11 | 42.336 | 1.80 | 1.80420 | 46.50 |
| S12 | 20.470 | 5.37 | — | — |
| S13* | 1395.401 | 4.90 | 1.50914 | 56.41 |
| S14* | 4122.679 | 12.80 | — | — |
| S15 | −25.058 | 1.50 | 1.49700 | 81.61 |
| S16 | 628.979 | 0.20 | — | — |
| S17 | 68.401 | 3.12 | 1.80518 | 25.46 |
| S18 | −213.323 | 6.57 | — | — |
| S19 | −19.207 | 1.20 | 1.58913 | 61.25 |
| S20 | −24.216 | 26.28~12.77~2.00 | — | — |
| S21* | 25.653 | 6.78 | 1.69350 | 53.54 |

TABLE 2-continued f = 20.50~28.07~39.77
Fno = 2.07~2.39~2.90
2ω = 65.63°~50.30°~36.70°
bf = 3.11

| Surf. No. | R | D | Nd | vd |
|---|---|---|---|---|
| S22* | −57.172 | 0.20 | — | — |
| S23 | 115.192 | 3.25 | 1.69680 | 55.46 |
| S24 | −78.903 | 1.00 | 1.59551 | 39.23 |
| S25 | 28.413 | 6.37 | — | — |
| S26 | −26.720 | 2.00 | 1.67270 | 32.17 |
| S27 | 71.919 | 6.20 | 1.49700 | 81.61 |
| S28 | −27.589 | 0.20 | — | — |
| S29* | −500.000 | 3.79 | 1.48749 | 70.45 |
| S30* | −32.727 | 38.00~47.57~62.36 | — | — |
| S31 | −100.000 | 3.50 | 1.83400 | 37.34 |
| S32 | −44.000 | 0.70 | — | — |
| S41 | ∞ | 3.00 | 1.51680 | 64.20 |
| S42 | ∞ | — | — | — |

*designates the aspherical surface which is rotationally symmetrical with respect to the optical axis.

Aspherical surface data (the aspherical surface coefficients not indicated are zero (0.00)).

Aspherical Surface Coefficients

| | | | |
|---|---|---|---|
| S13 | K = -0.100000 × 10³ | A = 0.521546 × 10⁻⁴ | B = -0.732367 × 10⁻⁷ |
| | | C = 0.222631 × 10⁻⁹ | D = -0.679169 × 10⁻¹³ |
| S14 | K = -0.100000 × 10³ | A = 0.421670 × 10⁻⁴ | B = -0.119066 × 10⁻⁶ |
| | | C = 0.382188 × 10⁻⁹ | D = -0.757078 × 10⁻¹² |
| S21 | K = 0.758444 | A = -0.786718 × 10⁻⁵ | B = -0.106818 × 10⁻⁷ |
| | | C = -0.195533 × 10⁻¹⁰ | D = -0.710529 × 10⁻¹³ |
| S22 | K = -0.523125 × 10 | A = 0.108758 × 10⁻⁴ | B = -0.399958 × 10⁻⁸ |
| | | C = -0.475537 × 10⁻¹⁰ | D = 0.149969 × 10⁻¹² |
| S29 | K = -0.100000 × 10³ | A = 0.408166 × 10⁻⁵ | B = -0.117530 × 10⁻⁷ |
| | | C = 0.185982 × 10⁻⁹ | D = -0.162667 × 10⁻¹² |
| S30 | K = -0.130886 × 10² | A = -0.321784 × 10⁻⁴ | B = 0.198124 × 10⁻⁶ |
| | | C = -0.472368 × 10⁻⁹ | D = 0.123930 × 10⁻¹¹ |

Aspherical Surface Coefficients

| Surf. | K | A | B | C | D |
|---|---|---|---|---|---|
| S13 | $-0.100000 \times 10^3$ | $0.521546 \times 10^{-4}$ | $-0.732367 \times 10^{-7}$ | $0.222631 \times 10^{-9}$ | $-0.679169 \times 10^{-13}$ |
| S14 | $-0.100000 \times 10^3$ | $0.421670 \times 10^{-4}$ | $-0.119066 \times 10^{-6}$ | $0.382188 \times 10^{-9}$ | $-0.757078 \times 10^{-12}$ |
| S21 | $0.758444$ | $-0.786718 \times 10^{-5}$ | $-0.106818 \times 10^{-7}$ | $-0.195533 \times 10^{-10}$ | $-0.710529 \times 10^{-13}$ |
| S22 | $-0.523125 \times 10$ | $0.108758 \times 10^{-4}$ | $-0.399958 \times 10^{-8}$ | $-0.475537 \times 10^{-10}$ | $0.149969 \times 10^{-12}$ |
| S29 | $-0.100000 \times 10^3$ | $0.408166 \times 10^{-5}$ | $-0.117530 \times 10^{-7}$ | $0.185982 \times 10^{-9}$ | $-0.162667 \times 10^{-12}$ |
| S30 | $-0.130886 \times 10^2$ | $-0.321784 \times 10^{-4}$ | $0.198124 \times 10^{-6}$ | $-0.472368 \times 10^{-9}$ | $0.123930 \times 10^{-11}$ |

TABLE 3

| Distance | ∞ | 2 m | 1 m |
|---|---|---|---|

Change in the distances upon focusing with the negative first lens element L11 through the positive fourth lens element L14:

| | ∞ | 2 m | 1 m |
|---|---|---|---|
| D18 | 5.83 | 6.57 | 7.32 |
| D20 | 26.28 | 26.28 | 26.28 |
| D30 | 38.00 | 38.00 | 38.00 |

Change in the distances upon focusing with the negative first lens element L11 through the negative fifth lens element L15:

| | ∞ | 2 m | 1 m |
|---|---|---|---|
| D18 | 5.83 | 5.83 | 5.83 |
| D20 | 26.28 | 26.68 | 27.08 |
| D30 | 38.00 | 38.00 | 38.00 |

[Embodiment 3]

The numerical values of a third embodiment of the compact wide-angle projector lens system are shown in Table 4. The signs and symbols in the table and drawings are the same as those of the first embodiment, and the wavelength values of CA1, CA2, CA3 and CA4 are also the same as those of the first embodiment.

Figure 7:
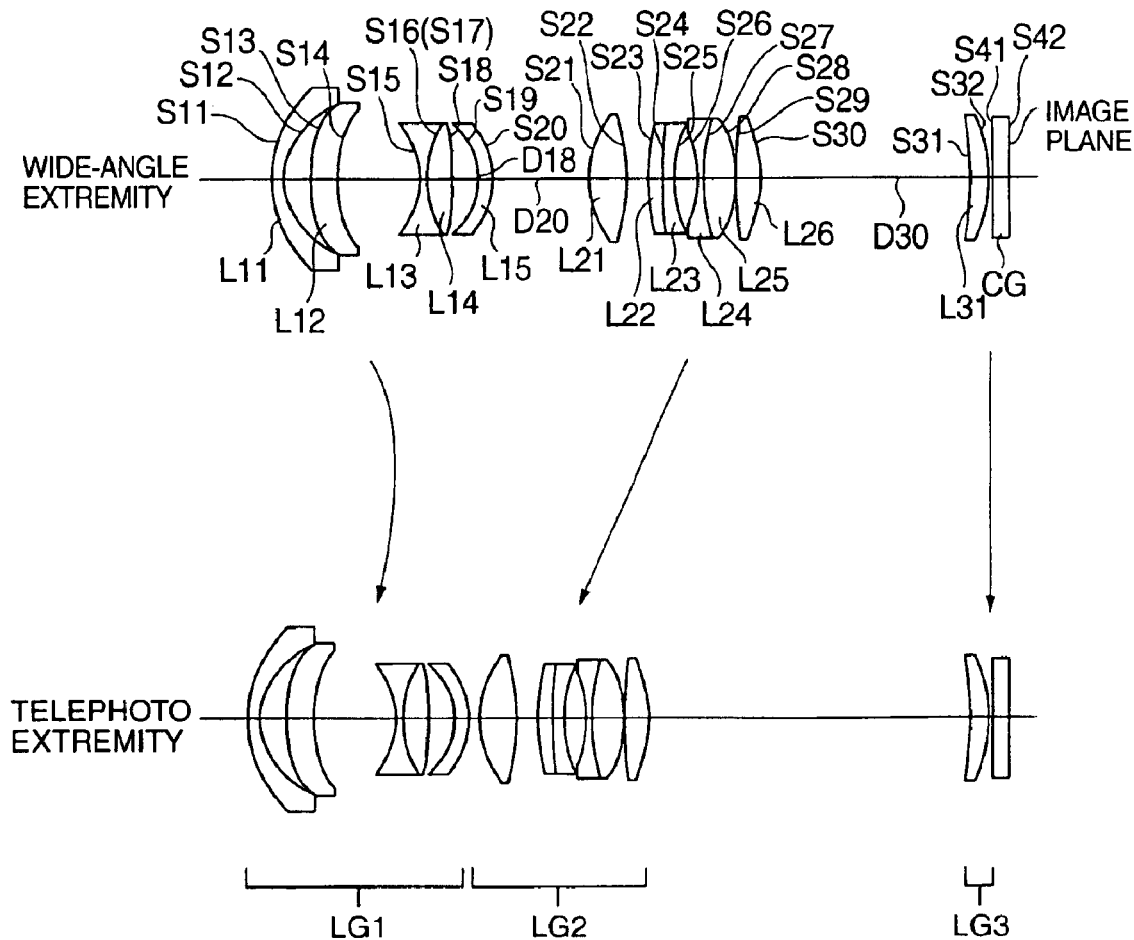
FIG. 7 shows a lens arrangement of a projector lens system according to a third embodiment of the present invention.

FIG. 7 shows a lens arrangement of a projector lens system according to the third embodiment.

FIGS. 8A through 8I show various aberrations occurred in the projector lens system of the third embodiment.

TABLE 4

$f = 20.46 \sim 27.10 \sim 34.78$
$Fno = 2.07 \sim 2.41 \sim 2.80$
$2\omega = 65.34° \sim 51.69° \sim 41.47°$
$bf = 3.12$

| Surf. No. | R | D | Nd | νd |
|---|---|---|---|---|
| S11 | 33.293 | 2.00 | 1.80610 | 33.27 |
| S12 | 19.757 | 5.00 | — | — |
| S13* | 360.804 | 4.43 | 1.50914 | 56.41 |
| S14* | 74.067 | 15.05 | — | — |
| S15 | -23.402 | 1.50 | 1.49700 | 81.61 |
| S16(17) | 32.513 | 4.19 | 1.80518 | 25.46 |
| S18 | -141.071 | 4.95 | — | — |
| S19 | -17.318 | 2.50 | 1.50518 | 25.46 |
| S20 | -22.631 | 17.87~8.52~2.16 | — | — |
| S21* | 28.534 | 6.08 | 1.66910 | 55.40 |
| S22* | -68.651 | 4.00 | — | — |
| S23 | 51.012 | 2.80 | 1.69680 | 55.46 |
| S24 | 145.297 | 1.89 | 1.80518 | 25.46 |
| S25 | 35.542 | 4.00 | — | — |
| S26 | -46.619 | 1.00 | 1.80610 | 33.27 |
| S27 | 42.190 | 6.00 | 1.48749 | 70.45 |
| S28 | -31.395 | 0.10 | — | — |
| S29 | 149.021 | 4.30 | 1.51760 | 63.50 |
| S30* | -35.920 | 38.00~47.48~58.44 | — | — |
| S31 | -100.000 | 3.50 | 1.83400 | 37.34 |
| S32 | -42.443 | 0.70 | — | — |
| S41 | ∞ | 3.00 | 1.51680 | 64.20 |
| S42 | ∞ | — | — | — |

*designates the aspherical surface which is rotationally symmetrical with respect to the optical axis.

Aspherical surface data (the aspherical surface coefficients not indicated are zero (0.00)).

Aspherical Surface Coefficients

| Surf. | K | A | B | C | D |
|---|---|---|---|---|---|
| S13 | $0.389395 \times 10^3$ | $0.731879 \times 10^{-4}$ | $-0.194798 \times 10^{-6}$ | $0.663439 \times 10^{-9}$ | $-0.831076 \times 10^{-12}$ |
| S14 | $0.180617 \times 10^2$ | $0.656650 \times 10^{-4}$ | $-0.276611 \times 10^{-6}$ | $0.105738 \times 10^{-8}$ | $-0.274290 \times 10^{-11}$ |
| S21 | $0.644345$ | $-0.445869 \times 10^{-5}$ | $-0.501870 \times 10^{-8}$ | $-0.171719 \times 10^{-12}$ | $-0.201427 \times 10^{-13}$ |
| S22 | $-0.526651 \times 10$ | $0.100175 \times 10^{-4}$ | $-0.347760 \times 10^{-8}$ | | |
| S30 | $-0.161748 \times 10^2$ | $-0.344867 \times 10^{-4}$ | $0.199889 \times 10^{-6}$ | $-0.639136 \times 10^{-9}$ | $0.124645 \times 10^{-11}$ |

[Embodiment 4]

The numerical values of a fourth embodiment of the compact wide-angle projector lens system are shown in Table 5. The signs and symbols in the table and drawings are the same as those of the first embodiment, and the wavelength values of CA1, CA2, CA3 and CA4 are also the same as those of the first embodiment.

Figure 9:
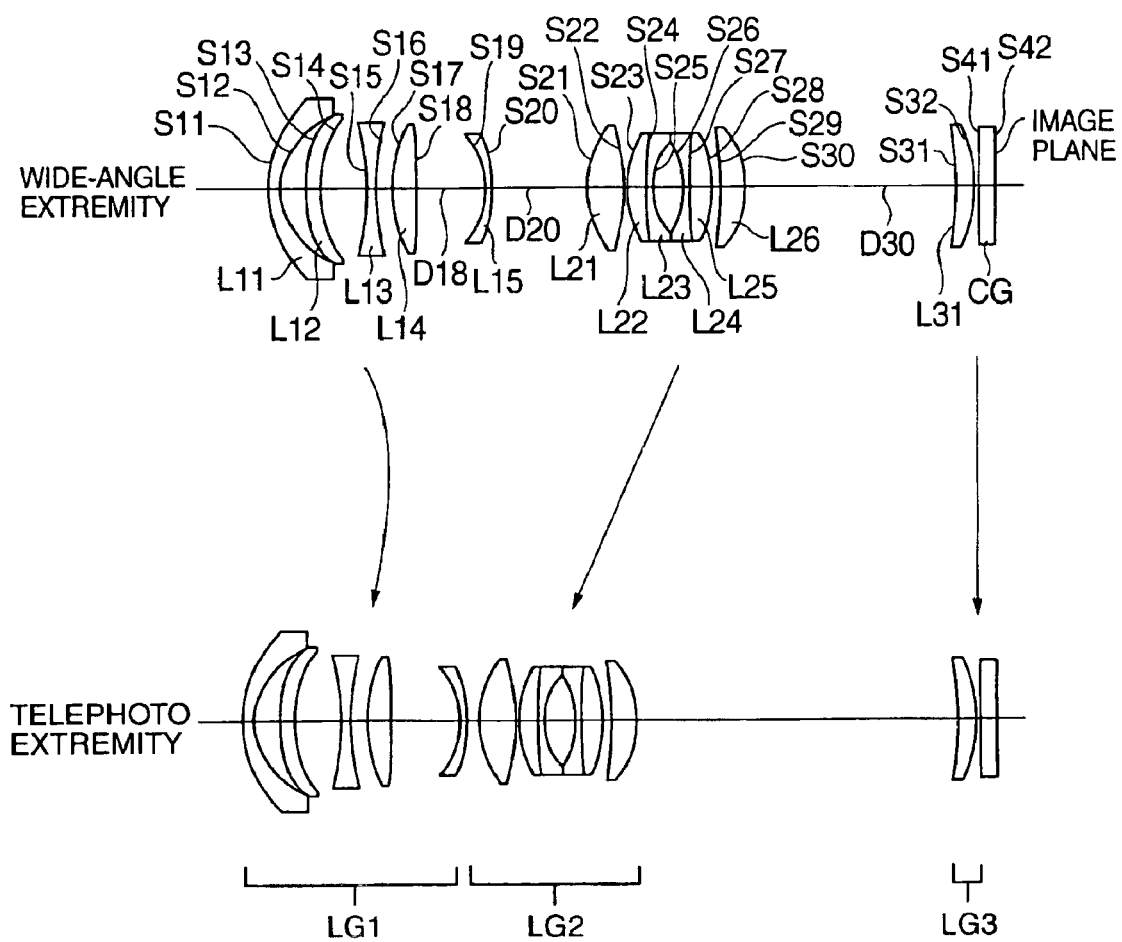
FIG. 9 shows a lens arrangement of a projector lens system according to a fourth embodiment of the present invention.

FIG. 9 shows a lens arrangement of a projector lens system according to the fourth embodiment.

FIGS. 10A through 10I show various aberrations occurred in the projector lens system of the fourth embodiment.

TABLE 5 f = 20.49~26.54~34.84
Fno = 2.07~2.39~2.82
2ω = 65.52°~52.67°~41.43°
bf = 3.12

| Surf. No. | R | D | Nd | νd |
|---|---|---|---|---|
| S11 | 36.354 | 1.50 | 1.80420 | 46.50 |
| S12 | 19.240 | 4.70 | — | — |
| S13* | −1178.675 | 2.52 | 1.50914 | 56.41 |
| S14* | 108.288 | 8.51 | — | — |
| S15 | −70.418 | 1.50 | 1.48749 | 70.45 |
| S16 | 56.812 | 3.22 | — | — |
| S17 | 36.686 | 4.21 | 1.80518 | 25.46 |
| S18 | 962.797 | 12.60 | — | — |
| S19 | −22.369 | 1.20 | 1.77250 | 49.62 |
| S20 | −45.658 | 17.30~9.04~2.37 | — | — |
| S21* | 27.081 | 6.00 | 1.69350 | 53.54 |
| S22* | −59.550 | 0.67 | — | — |
| S23 | 29.126 | 3.69 | 1.63854 | 55.45 |
| S24 | 678.818 | 1.03 | 1.71736 | 29.50 |
| S25 | 18.188 | 5.44 | — | — |
| S26 | −25.443 | 1.11 | 1.62588 | 35.74 |
| S27 | −1311.448 | 3.93 | 1.51680 | 64.20 |
| S28* | −26.837 | 1.52 | — | — |
| S29 | −102.054 | 4.55 | 1.58913 | 61.25 |
| S30 | −24.384 | 38.00~46.46~58.07 | — | — |
| S31 | −73.529 | 3.50 | 1.83400 | 37.34 |
| S32 | −37.060 | 0.70 | — | — |
| S41 | ∞ | 3.00 | 1.51680 | 64.20 |
| S42 | ∞ | — | — | — |

*designates the aspherical surface which is rotationally symmetrical with respect to the optical axis.

Aspherical surface data (the aspherical surface coefficients not indicated are zero (0.00)).

Aspherical Surface Coefficients

| S13 | K = −0.632843 × 10⁵ | A = 0.114298 × 10⁻³ | B = −0.393675 × 10⁻⁶ |
|---|---|---|---|
|  |  | C = 0.123347 × 10⁻⁸ | D = −0.182823 × 10⁻¹¹ |
| S14 | K = 0.389146 × 10² | A = 0.108471 × 10⁻³ | B = −0.447785 × 10⁻⁶ |
|  |  | C = 0.129272 × 10⁻⁸ | D = −0.260624 × 10⁻¹¹ |
| S21 | K = 0.405991 | A = −0.852607 × 10⁻⁵ | B = −0.163933 × 10⁻⁷ |
|  |  | C = 0.240787 × 10⁻¹⁰ | D = −0.138186 × 10⁻¹² |
| S22 | K = −0.365067 × 10 | A = 0.801662 × 10⁻⁵ | B = −0.119792 × 10⁻⁷ |
| S28 | K = −0.695081 | A = 0.661517 × 10⁻⁵ | B = 0.289296 × 10⁻⁷ |
|  |  | C = −0.492831 × 10⁻¹⁰ | D = −0.174230 × 10⁻¹² |

[Embodiment 5]

The numerical values of a fifth embodiment of the compact wide-angle projector lens system are shown in Table 6. The signs and symbols in the table and drawings are the same as those of the first embodiment, and the wavelength values of CA1, CA2, CA3 and CA4 are also the same as those of the first embodiment.

Figure 11:
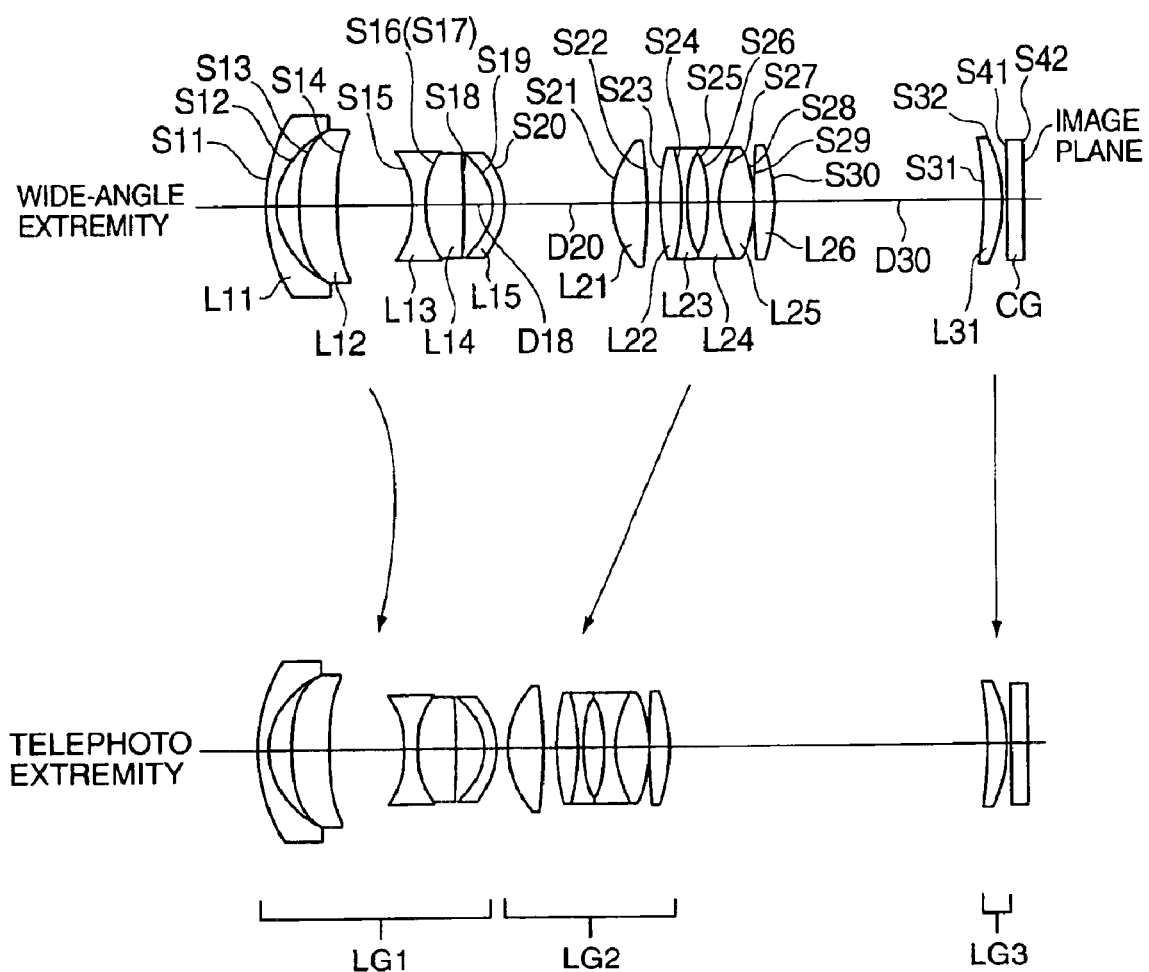
FIG. 11 shows a lens arrangement of a projector lens system according to a fifth embodiment of the present invention.
Figure 12A:
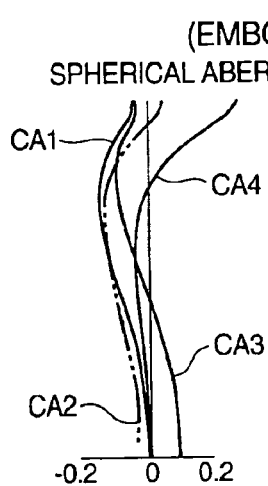
FIGS. 12A, 12B, 12C, 12D, 12E, 12F, 12G, 12H and 12I show various aberrations occurred in the projector lens system of the fifth embodiment.
Figure 12B:
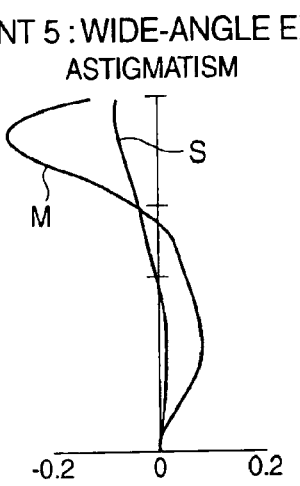
Figure 12C:
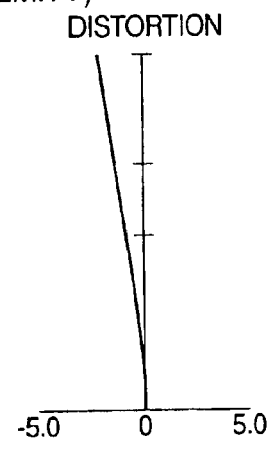
Figure 12D:
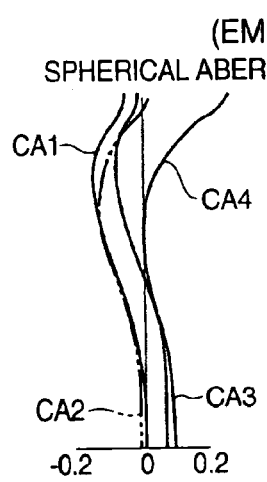
Figure 12E:
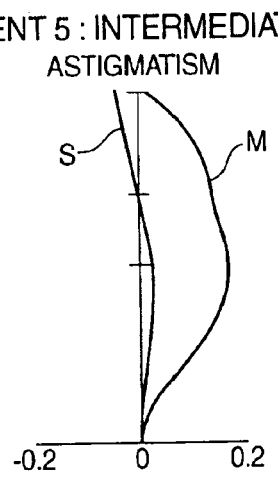
Figure 12F:
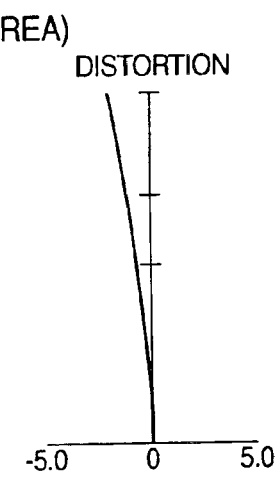
Figure 12G:
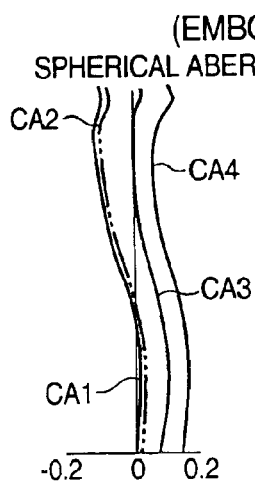
Figure 12H:
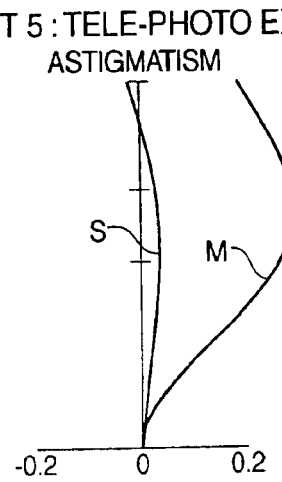
Figure 12I:
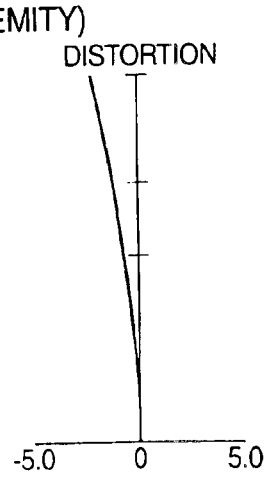

FIG. 11 shows a lens arrangement of a projector lens system according to the fifth embodiment.

FIGS. 12A through 12I show various aberrations occurred in the projector lens system of the fifth embodiment.

TABLE 6 f = 20.50~27.13~34.85
Fno = 2.07~2.40~2.78
2ω = 65.43°~51.73°~41.42°
bf = 3.11

| Surf. No. | R | D | Nd | νd |
|---|---|---|---|---|
| S11 | 53.961 | 1.55 | 1.80518 | 25.46 |
| S12 | 20.813 | 4.23 | — | — |
| S13* | 136.815 | 6.91 | 1.58300 | 30.05 |
| S14* | 446.191 | 13.38 | — | — |
| S15 | −26.652 | 2.24 | 1.49700 | 81.61 |
| S16(17) | 30.659 | 6.46 | 1.80518 | 25.46 |
| S18 | −527.770 | 5.35 | — | — |
| S19* | −16.675 | 2.26 | 1.50914 | 56.41 |
| S20 | −21.684 | 19.42~9.15~2.10 | — | — |
| S21* | 27.149 | 6.20 | 1.70154 | 41.15 |
| S22* | −102.364 | 2.44 | — | — |
| S23 | 57.409 | 4.06 | 1.60311 | 60.69 |
| S24 | −67.042 | 1.00 | 1.64769 | 33.84 |
| S25 | 43.478 | 3.77 | — | — |
| S26 | −44.870 | 2.00 | 1.76182 | 26.61 |
| S27 | 30.491 | 6.22 | 1.51680 | 64.20 |
| S28 | −40.047 | 0.10 | — | — |
| S29 | 248.740 | 3.80 | 1.51680 | 64.20 |
| S30* | −35.989 | 38.00~47.01~57.52 | — | — |
| S31 | −100.000 | 3.50 | 1.83400 | 37.34 |
| S32 | −41.926 | 0.70 | — | — |
| S41 | ∞ | 3.00 | 1.51680 | 64.20 |
| S42 | ∞ | — | — | — |

*designates the aspherical surface which is rotationally symmetrical with respect to the optical axis.

Aspherical surface data (the aspherical surface coefficients not indicated are zero (0.00)).

Aspherical Surface Coefficients

| | | | |
|---|---|---|---|
| S13 | $K = -0.290056 \times 10^3$ | $A = 0.575052 \times 10^{-4}$ | $B = -0.112235 \times 10^{-6}$ |
| | | $C = 0.418545 \times 10^{-9}$ | $D = -0.513328 \times 10^{-12}$ |
| S14 | $K = 0.686271 \times 10^3$ | $A = 0.365126 \times 10^{-4}$ | $B = -0.917797 \times 10^{-7}$ |
| | | $C = 0.358076 \times 10^{-9}$ | $D = -0.105402 \times 10^{-11}$ |
| S19 | $K = -0.312349$ | $A = -0.726388 \times 10^{-5}$ | $B = -0.276078 \times 10^{-7}$ |
| | | $C = -0.128642 \times 10^{-10}$ | $D = -0.543465 \times 10^{-12}$ |
| S21 | $K = 0.973726$ | $A = -0.538604 \times 10^{-5}$ | $B = -0.142938 \times 10^{-7}$ |
| | | $C = 0.252059 \times 10^{-11}$ | $D = -0.127605 \times 10^{-12}$ |
| S22 | $K = -0.249011 \times 10$ | $A = 0.994834 \times 10^{-5}$ | $B = -0.361827 \times 10^{-8}$ |
| | | $C = -0.299959 \times 10^{-10}$ | $D = 0.964089 \times 10^{-13}$ |
| S30 | $K = -0.173255 \times 10^2$ | $A = -0.338162 \times 10^{-4}$ | $B = 0.237688 \times 10^{-6}$ |
| | | $C = -0.811852 \times 10^{-9}$ | $D = 0.182309 \times 10^{-11}$ |

Table 7 shows the numerical values for each of conditions (1) through (16) in each of the first through fifth embodiments.

TABLE 7

| | Embod. 1 | Embod. 2 | Embod. 3 | Embod. 4 | Embod. 5 |
|---|---|---|---|---|---|
| Cond. (1) | 0.73 | 0.71 | 0.86 | 0.88 | 0.80 |
| Cond. (2) | 0.60 | 0.57 | 0.37 | 0.44 | 0.60 |
| Cond. (3) | -1.44 | -1.42 | -1.21 | -1.22 | -1.24 |
| Cond. (4) | 1.26 | 1.51 | 1.38 | 1.05 | 1.54 |
| Cond. (5) | 35.73 | 37.66 | 21.32 | 30.06 | 29.04 |
| Cond. (6) | 1.81 | 1.81 | 1.81 | 1.81 | 1.81 |
| Cond. (7) | 0.06 | 0.01 | 0.13 | 0.12 | 0.08 |
| Cond. (8) | 0.65 | 0.73 | 0.69 | 0.32 | 0.75 |
| Cond. (9) | 1.99 | 2.71 | 1.82 | 1.93 | 1.96 |
| Cond. (10) | -0.23 | -0.26 | -0.26 | -0.12 | -0.37 |
| Cond. (11) | 1.32 | 1.40 | 1.17 | 1.19 | 1.26 |
| Cond. (12) | -0.73 | -0.78 | -0.79 | -1.11 | -0.75 |
| Cond. (13) | -1.03 | -1.35 | -0.72 | -1.27 | -0.76 |
| Cond. (14) | 30.80 | 29.56 | 31.84 | 25.99 | 27.34 |
| Cond. (15) | 0.18 | 0.20 | 0.18 | 0.11 | 0.14 |
| Cond. (16) | — | 0.23 | 0.24 | 0.24 | 0.24 |

As can be understood from Table 7, the numerical values of each of the first through fifth embodiments satisfy each of conditions (1) through (16). Furthermore, as can be understood from the aberration diagrams of each embodiment, the various aberrations can be adequately corrected.

According to the present invention, a projector lens system, which is compact, has a wide angle-of-view, and has a high image-forming performance suitable for a light bulb such as a DMD, is achieved; and a projector apparatus with the projector lens system can be made compact, and can attain high picture quality.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A projector lens system that projects and enlarges an image from a light bulb of a projector display device,
    wherein said projector lens system comprises a negative first lens group and a positive second lens group, in this order from the projection side;
    wherein said negative first lens group comprises a first lens element that is formed as a negative meniscus lens element having the convex surface facing toward the projection side, a positive or negative second lens element, a negative third lens element, a positive fourth lens element that is cemented to or separated from said third lens element, and a negative fifth lens element, in this order from the projection side; and
    wherein said negative first lens group satisfies condition (1) with respect to the refractive power thereof, and satisfies condition (2) with respect to the refractive power of said negative first lens element of said negative first lens group:

$$0.6 < f_w/|f_I| < 1.0 \tag{1}$$

$$(f_I < 0)$$

$$0.3 < f_I/f_{1,1} < 0.7 \tag{2}$$

wherein $f_w$ designates the focal length of the entire projector lens system at the wide-angle extremity;

$f_I$ designates the focal length of said negative first lens group; and $f_{1,1}$ designates the focal length of said negative first lens element of said negative first lens group.

2. The projector lens system according to claim 1, wherein a radius of curvature of the light-bulb-side surface of said negative first lens element of said negative first lens group satisfies condition (3);
    wherein a radius of curvature of the projection-side surface of said negative fifth lens element of the negative first lens group satisfies condition (4);
    wherein Abbe numbers of glass materials used for lens elements of said negative first lens group except for said second lens element satisfy condition (5); and
    wherein a refractive index of a glass material used for said positive fourth lens element satisfies condition (6):

$$-1.8 < f_I/r_{12} < -1.0 \tag{3}$$

$$0.8 < f_I/r_{19} < 1.7 \tag{4}$$

$$15 < (v_{1,1} + v_{1,3} + v_{1,5})/3 - v_{1,4} \tag{5}$$

$$1.7 < n_{1,4} \tag{6}$$

wherein $r_{12}$ designates a radius of curvature of the light-bulb-side surface of said negative first lens element of said negative first lens group;

$r_{19}$ designates a radius of curvature of the projection-side surface of said negative fifth lens element of said negative first lens group;

$v_{1,1}$ designates the Abbe number of said negative first lens element of said negative first lens group;

$\nu_{1,3}$ designates the Abbe number of said negative third lens element of said negative first lens group;

$\nu_{1,4}$ designates the Abbe number of said positive fourth lens element of said negative first lens group;

$\nu_{1,5}$ designates the Abbe number of said negative fifth lens element of said negative first lens group; and $n_{1,4}$ designates the refractive index with respect to the d-line of said positive fourth lens element of said negative first lens group.

3. The projector lens system according to claim 1, wherein said second lens element of said negative first lens group is made from a resin material;

wherein an aspherical surface is formed on at least the light-bulb-side surface of said second lens element; and wherein said second lens element satisfies condition (7) with respect to the refractive power:

$$|f_I/f_{1,2}|<0.25 \tag{7}$$

wherein $f_{1,2}$ designates the focal length of said second lens element of said negative first lens group.

4. The projector lens system according to claim 1, wherein said projector lens system is arranged to perform focusing by moving said negative first lens element through said positive fourth lens element toward the projection side, in accordance with the change in a projecting distance from infinity to a closer distance; and wherein the combined focal length of said first through fourth lens elements satisfies condition (8):

$$0.2<f_I/f_{1,1-4}<0.9 \tag{8}$$

wherein $f_{1,4}$ designates the combined focal length of said negative first through positive fourth lens elements of said negative first lens group.

5. The projector lens system according to claim 1, wherein said second lens group comprises a positive first lens element, a positive second lens element, a negative third lens element that is cemented to said second lens element, a negative fourth lens element, a positive fifth lens element that is cemented to said negative fourth lens element, and a positive sixth lens element;

wherein said positive first lens element and said positive sixth lens element of the second lens group satisfy condition (9) with respect to the refractive power thereof; and wherein said negative fourth lens element and said positive fifth lens element that are cemented satisfy condition (10) with respect to the combined focal length thereof:

$$1.7<f_{2,6}/f_{2,1}<3.0 \tag{9}$$

$$-0.5<f_{II}/f_{2,4-5}<0 \tag{10}$$

wherein $f_{2,1}$ designates the focal length of said positive first lens element of said second lens group;

$f_{2,6}$ designates the focal length of said positive sixth lens element of said second lens group;

$f_{II}$ designates the focal length of said second lens group; and $f_{2,4-5}$ designates the combined focal length of said negative fourth less element and said positive fifth lens element of said second lens group.

6. The projector lens system according to claim 5, wherein a radius of curvature of the projection-side surface of said positive first lens element of said second lens group satisfies condition (11);

wherein a relationship between a radius of curvature of the projection-side surface of said positive first lens element and a radius of curvature of the light-bulb-side surface of said positive sixth lens element satisfies condition (12);

wherein a radius of curvature of the projection-side surface of said negative fourth lens element and a refractive power of said second lens group satisfies condition (13);

wherein an Abbe number of a glass material used for each of said positive and negative lens elements of said second lens group satisfies condition (14); and wherein a refractive index of a glass material used for each of said positive lens elements of said second lens group satisfies condition (15):

$$1.0<f_{II}/r_{21}<1.6 \tag{11}$$

$$-1.5<r_{21}/r_{30}<-0.6 \tag{12}$$

$$-1.5<f_{II}/r_{26}<-0.6 \tag{13}$$

$$15<(\nu_{2,1}+\nu_{2,2}+\nu_{2,5}+\nu_{2,6})/4-(\nu_{2,3}+\nu_{2,4})/2 \tag{14}$$

$$0<(n_{2,1}+n_{2,2})/2-(n_{2,5}+n_{2,6})/2 \tag{15}$$

wherein $r_{21}$ designates a radius of curvature of the projection-side surface of said positive first lens element of said second lens group;

$r_{26}$ designates a radius of curvature of the projection-side surface of said negative fourth lens element of said second lens group;

$r_{30}$ designates a radius of curvature of the light-bulb-side surface of said positive sixth lens element of said second lens group;

$\nu_{2,1}$ designates the Abbe number of said positive first lens element of said second lens group;

$\nu_{2,2}$ designates the Abbe number of said positive second lens element of said second lens group;

$\nu_{2,3}$ designates the Abbe number of said negative third lens element of said second lens group;

$\nu_{2,4}$ designates the Abbe number of said negative fourth lens element of said second lens group;

$\nu_{2,5}$ designates the Abbe number of said positive fifth lens element of said second lens group;

$\nu_{2,6}$ designates the Abbe number of said positive sixth lens element of said second lens group;

$n_{2,1}$ designates the refractive index of said positive first lens element with respect to the d-line;

$n_{2,2}$ designates the refractive index of said positive second lens element with respect to the d-line;

$n_{2,5}$ designates the refractive index of the positive fifth lens element with respect to the d-line; and $n_{2,6}$ designates the refractive index of said positive sixth lens element with respect to the d-line.

7. The projector lens system according to claim 5 wherein at least one of the projection-side surface of said positive first lens element and the light-bulb-side surface of said positive sixth lens element of the second lens group comprise an aspherical surface.

8. A projector lens system that projects and enlarges an image from a light bulb of a projector display device wherein said projector lens system comprises a negative first lens group, a positive second lens group, and positive third lens group, in this order from the projection side;

wherein said negative first lens group comprises a first lens element that is formed as a negative meniscus lens element having the convex surface facing toward the projection side, a positive or negative second lens element, a negative third lens element, a positive fourth lens element that is cemented to or separated from said third lens element, and a negative fifth lens element, in this order from the projection side; and wherein said negative first lens group satisfies condition (1) with respect to the refractive power thereof, and satisfies condition (2) with respect to the refractive power of said negative first lens element of said negative first lens group:

$$0.6 < f_w/|f_I| < 1.0 \tag{1}$$

$$(f_I < 0)$$

$$0.3 < f_I/f_{1,1} < 0.7 \tag{2}$$

wherein $f_w$ designates the focal length of the entire projector lens system at the wide-angle extremity;

$f_I$ designates the focal length of said negative first lens group; and $f_{1,1}$ designates the focal length of said negative first lens element of said negative first lens group.

9. The projector lens system according to claim 8, wherein a radius of curvature of the light-bulb-side surface of said negative first lens element of said negative first lens group satisfies condition (3);

wherein a radius of curvature of the projection-side surface of said negative fifth lens element of the negative first lens group satisfies condition (4);

wherein Abbe numbers of glass materials used for lens elements of said negative first lens group except for said second lens element satisfy condition (5); and wherein a refractive index of a glass material used for said positive fourth lens element satisfies condition (6):

$$-1.8 < f_I/r_{12} < -1.0 \tag{3}$$

$$0.8 < f_I/r_{19} < 1.7 \tag{4}$$

$$15 < (\nu_{1,1} + \nu_{1,3} + \nu_{1,5})/3 - \nu_{1,4} \tag{5}$$

$$1.7 < n_{1,4} \tag{6}$$

wherein $r_{12}$ designates a radius of curvature of the light-bulb-side surface of said negative first lens element of said negative first lens group;

$r_{19}$ designates a radius of curvature of the projection-side surf-ace of said negative fifth lens element of said negative first lens group;

$\nu_{1,1}$ designates the Abbe number of said negative first lens element of said negative first lens group;

$\nu_{1,3}$ designates the Abbe number of said negative third lens element of said negative first lens group;

$\nu_{1,4}$ designates the Abbe number of said positive fourth lens element of said negative first lens group;

$\nu_{1,5}$ designates the Abbe number of said negative fifth lens element of said negative first lens group; and $n_{1,4}$ designates the refractive index with respect to the d-line of said positive fourth lens element of said negative first lens group.

10. The projector lens system according to claim 8, wherein said second lens element of said negative first lens group is made from a resin material;

wherein an aspherical surface is formed on at least the light-bulb -side surface of said second lens element; and wherein said second lens element satisfies condition (7) with respect to the refractive power:

$$|f_I/f_{1,2}| < 0.25 \tag{7}$$

wherein $f_{1,2}$ designates the focal length of said second lens element of said negative first lens group.

11. The projector lens system according to claim 8, wherein said projector lens system is arranged to perform focusing by moving said negative first lens element through said positive fourth lens element toward the projection side, in accordance with the change in a projecting distance from infinity to a closer distance; and wherein the combined focal length of said first through fourth lens elements satisfies condition (8):

$$0.2 < f_I/f_{1,1-4} < 0.9 \tag{8}$$

wherein $f_{1,1-4}$ designates the combined focal length of said negative first through positive fourth lens elements of said negative first lens group.

12. The projector lens system according to claim 8, wherein said second lens group comprises a positive first lens element, a positive second lens element, a negative third lens element that is cemented to said second lens element, a negative fourth lens element, a positive fifth lens element that is cemented to said negative fourth lens element, and a positive sixth lens element;

wherein said positive first lens element and said positive sixth lens element of the second lens group satisfy condition (9) with respect to the refractive power thereof; and wherein said negative fourth lens element and said positive fifth lens element that are cemented satisfy condition (10) with respect to the combined focal length thereof:

$$1.7 < f_{2,6}/f_{2,1} < 3.0 \tag{9}$$

$$-0.5 < f_{II}/f_{2,4-5} < 0 \tag{10}$$

wherein $f_{2,1}$ designates the focal length of said positive first lens element of said second lens group;

$f_{2,6}$ designates the focal length of said positive sixth lens element of said second lens group;

$f_{II}$ designates the focal length of said second lens group; and $f_{2,4-5}$ designates the combined focal length of said negative fourth lens element and said positive fifth lens element of said second lens group.

13. The projector lens system according to claim 12, wherein a radius of curvature of the projection-side surface of said positive first lens element of said second lens group satisfies condition (11);

wherein a relationship between a radius of curvature of the projection-side surface of said positive first lens element and a radius of curvature of the light-bulb-side surface of said positive sixth lens element satisfies condition (12);

wherein a radius of curvature of the projection-side surface of said negative fourth lens element and a refractive power of said second lens group satisfies condition (13);

wherein an Abbe number of a glass material used for each of said positive and negative lens elements of said second lens group satisfies condition (14); and wherein a refractive index of a glass material used for each of said positive lens elements of said second lens group satisfies condition (15):

$$1.0 < f_{II}/r_{21} < 1.6 \quad (11)$$

$$-1.5 < r_{21}/r_{30} < -0.6 \quad (12)$$

$$-1.5 < f_{II}/r_{26} < -0.6 \quad (13)$$

$$15 < (v_{2,1}+v_{2,2}+v_{2,5}+v_{2,6})/4 - (v_{2,3}+v_{2,4})/2 \quad (14)$$

$$0 < (n_{2,1}+n_{2,2})/2 - (n_{2,5}+n_{2,6})/2 \quad (15)$$

wherein $r_{21}$ designates a radius of curvature of the projection-side surface of said positive first lens element of said second lens group;

$r_{26}$ designates a radius of curvature of the projection-side surface of said negative fourth lens element thereof;

$r_{30}$ designates a radius of curvature of the light-bulb-side surface of said positive sixth lens element thereof;

$v_{2,1}$ designates the Abbe number of said positive first lens element thereof;

$v_{2,2}$ designates the Abbe number of said positive second lens element thereof;

$v_{2,3}$ designates the Abbe number of said negative third lens element thereof;

$v_{2,4}$ designates the Abbe number of said negative fourth lens element thereof;

$v_{2,5}$ designates the Abbe number of said positive fifth lens element thereof;

$v_{2,6}$ designates the Abbe number of said positive sixth lens element thereof;

$n_{2,1}$ designates the refractive index of said positive first lens element thereof with respect to the d-line;

$n_{2,2}$ designates the refractive index of said positive second lens element thereof with respect to the d-line;

$n_{2,5}$ designates the refractive index of the positive fifth lens element thereof with respect to the d-line; and $n_{2,6}$ designates the refractive index of said positive sixth lens element thereof with respect to the d-line.

14. The projector lens system according to claim 12, wherein at least one of the projection-side surface of said positive first lens element and the light-bulb-side surface of said positive sixth lens element of the second lens group comprise an aspherical surface.

15. The projector lens system according to claim 8, wherein said third lens group comprises one positive lens element; and wherein said third lens group satisfies condition (16) with respect to the refractive power thereof:

$$0.20 < f_w/f_{III} < 0.27 \quad (16)$$

wherein $f_{III}$ designates the focal length of said third lens group.

* * * * *